United States Patent
Chiang et al.

(10) Patent No.: US 11,801,964 B2
(45) Date of Patent: Oct. 31, 2023

(54) SMALL CARBONATED BEVERAGE PACKAGING WITH ENHANCED SHELF LIFE PROPERTIES

(71) Applicant: THE COCA-COLA COMPANY, Atlanta, GA (US)

(72) Inventors: Casper W. Chiang, Danville, CA (US); Venkat Govindarajan, Duluth, GA (US); Gopalaswamy Rajesh, Alpharetta, GA (US); Christopher Russell Mubarak, Cumming, GA (US); Jose Olavo Martins Ferreira Salles, Pulaski, WI (US); Sterling Lane Steward, Douglasville, GA (US); Simon Shi, Marietta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 184 days.

(21) Appl. No.: 17/356,668

(22) Filed: Jun. 24, 2021

(65) Prior Publication Data

US 2022/0363425 A1 Nov. 17, 2022

Related U.S. Application Data

(63) Continuation of application No. 15/500,250, filed as application No. PCT/US2015/043328 on Jul. 31, 2015, now Pat. No. 11,077,979.

(Continued)

(51) Int. Cl.
*B65D 1/02* (2006.01)
*B32B 1/02* (2006.01)
(Continued)

(52) U.S. Cl.
CPC .......... *B65D 1/0215* (2013.01); *B29C 49/22* (2013.01); *B32B 1/02* (2013.01); *B65B 3/022* (2013.01);
(Continued)

(58) Field of Classification Search
None
See application file for complete search history.

(56) References Cited

U.S. PATENT DOCUMENTS 4,392,055 A 7/1983 Whitney
4,978,015 A 12/1990 Walker
(Continued)

FOREIGN PATENT DOCUMENTS

DE 102004020185 A1 11/2005
EP 0888861 A1 1/1999
(Continued)

OTHER PUBLICATIONS

Korean Office Action, Application No. 10-2017-7005580, dated Jan. 20, 2022 (with English translation) (102 pp ).

(Continued)

*Primary Examiner* — Lee E Sanderson
(74) *Attorney, Agent, or Firm* — Eversheds Sutherland (US) LLP

(57) ABSTRACT

This disclosure provides new containers, preforms, methods, and designs for small and light-weight carbonated beverage packaging that provide surprisingly improved carbonation retention and greater shelf life, while still achieving light weight. This disclosure is particularly drawn to small PET containers for carbonated beverages, for example less than or about 400 mL, and methods and designs for their fabrication that attain unexpectedly good carbonation retention and shelf life.

18 Claims, 12 Drawing Sheets

Related U.S. Application Data

(60) Provisional application No. 62/032,428, filed on Aug. 1, 2014.

(51) Int. Cl.

| | | |
|---|---|---|
| *B29C 49/22* | (2006.01) | |
| *B65B 3/02* | (2006.01) | |
| *B65D 23/02* | (2006.01) | |
| *B65D 23/08* | (2006.01) | |
| *B29C 49/12* | (2006.01) | |
| *B29K 67/00* | (2006.01) | |
| *B29L 31/00* | (2006.01) | |

(52) U.S. Cl.
CPC ............ *B65D 1/02* (2013.01); *B65D 1/0207* (2013.01); *B65D 1/0223* (2013.01); *B65D 1/0246* (2013.01); *B65D 1/0261* (2013.01); *B65D 1/0284* (2013.01); *B65D 23/02* (2013.01); *B65D 23/0821* (2013.01); *B29C 49/12* (2013.01); *B29K 2067/003* (2013.01); *B29K 2995/0067* (2013.01); *B29L 2031/7158* (2013.01)

(56) References Cited

U.S. PATENT DOCUMENTS

| | | | |
|---|---|---|---|
| 8,956,707 B2 | 2/2015 | Hanan | |
| 2003/0209553 A1* | 11/2003 | Horn | B29C 49/0005 |
| | | | 220/669 |
| 2005/0218103 A1 | 10/2005 | Barker et al. | |
| 2005/0260371 A1 | 11/2005 | Shi et al. | |
| 2006/0105127 A1 | 5/2006 | Akiyama et al. | |
| 2008/0061476 A1 | 3/2008 | Hutchinson et al. | |
| 2008/0257855 A1 | 10/2008 | Patel | |
| 2012/0263902 A1 | 10/2012 | Hanan | |
| 2013/0292415 A1 | 11/2013 | Stanley et al. | |
| 2015/0122766 A1 | 5/2015 | Hanan | |
| 2016/0176566 A1 | 6/2016 | Hanan | |

FOREIGN PATENT DOCUMENTS

| | | |
|---|---|---|
| EP | 2163372 A1 | 3/2010 |
| GB | 1341845 A | 5/1997 |
| JP | H04215936 A | 8/1992 |
| JP | H08-238667 A | 9/1996 |
| JP | H08238667 A | 9/1996 |
| JP | 2001072032 A | 3/2001 |
| JP | 2001520135 A | 10/2001 |
| JP | 2004-067171 A | 3/2004 |
| JP | 2006-315697 A | 11/2006 |
| JP | 2008-105199 A | 5/2008 |
| JP | 2008514521 A | 5/2008 |
| JP | 2008540186 A | 11/2008 |
| JP | 2009-45876 A | 3/2009 |
| JP | 2009-262947 A | 11/2009 |
| JP | 2013523549 A | 6/2013 |
| JP | 2013-543805 A | 12/2013 |
| JP | 2013543805 A | 12/2013 |
| JP | 2014-8969 A | 1/2014 |
| JP | 2014-5071 A | 2/2014 |
| WO | 2008095842 A1 | 8/2008 |
| WO | 2008149819 A1 | 8/2010 |
| WO | 2012/065162 A | 5/2012 |
| WO | 2012065162 A1 | 5/2012 |
| WO | 2017136584 A1 | 8/2017 |

OTHER PUBLICATIONS

PCT International Search Report and Written Opinion for International Application No. PCT/US2015/043328 dated Oct. 20, 2015.
European Search Report issued in Application No. 15827487.8, completed Nov. 6, 2017 (7 pages).
Third Party Observation in EP 15827166.8, Mar. 21, 2019, pp. 1-14.
Third Party Submission under 37 CFR 1.290 in U.S. Appl. No. 15/500,250, Apr. 16, 2019 Notification Date.
Third Party Observation in EP 15827487.8, Apr. 2, 2019, pp. 1-7.
Third Party Observation in U.S. Appl. No. 15/500,250, Apr. 11, 2019, pp. 1-9.
Office Action in JP2017-500999, dated Apr. 19, 2019, pp. 1-7.
Office Action in Chinese Patent Application No. 2015800469163, dated May 8, 2019, pp. 1-4.
Office Action in JP2017-504359, dated Jul. 1, 2019, pp. 1-26.
Brooks, David W., et al., Pet Packaging Technology, Sheffield Academic Press, CRC Press, 2002 (Part 1—198 pp.).
Brooks, David W., et al., Pet Packaging Technology, Sheffield Academic Press, CRC Press, 2002 (Part 2—192 pp.).
Annex of EP3 174 803 B1, Feature Analysis of Claims 1, 11, and 16 (2 pp).
Notice of Opposition, EP 3 174 803, with attached Exhibits A, B, C, and D, dated Dec. 16, 2020 (76 pp.).
(Krones) Opposition, EP 3 174 803, dated Dec. 16, 2020 (64 pp.).

* cited by examiner

SMALL CARBONATED BEVERAGE PACKAGING WITH ENHANCED SHELF LIFE PROPERTIES

CROSS REFERENCE TO RELATED APPLICATIONS

This application is a continuation of U.S. patent application Ser. No. 15/500,250, filed Jan. 30, 2017, which is a 35 U.S.C. § 371 National stage application of International Patent Application No. PCT/US2015/043328, filed Jul. 31, 2015, which claims the benefit of priority from U.S. Provisional Application No. 62/032,428, filed Aug. 1, 2014, each of which is incorporated herein by reference in its entirety.

TECHNICAL FIELD

This disclosure relates to small and light-weight beverage packaging suitable for use with carbonated beverages and having good gas barrier properties.

BACKGROUND

Polyester and particularly polyethylene terephthalate (PET) containers have been used for packaging beverages such as carbonated soft drinks (CSD) for many years. Over this time, container designs have been improved and optimized for increasingly lighter weights and affordability. The resin compositions, polymer properties, selected additives, and container designs have all been adjusted for maintaining or improving carbonation retention. Good carbonation retention has been key to improving shelf life of the carbonated product, but achieving this goal has become increasingly difficult with lighter weight bottle designs.

Factors contributing to shelf life include permeation, creep, sorption and closure loss, the latter related to both permeation and leakage. Each of these parameters is dependent on a variety of properties. For example, permeation is generally dependent on material characteristics such as the percent (%) crystallinity, orientation, surface area, and material thickness. Creep is primarily determined by container geometry and material distribution. Sorption is related to the amount of gas ($CO_2$) that can dissolve in the PET itself and is dependent on both the amount (g) of PET available as well as its crystallinity. Closure loss is generally determined by the available closure surface area for permeation and leakage.

Particular problems with carbonation retention arise when packaging carbonated beverages in small bottles that are generally about 300 mL or less. Conventional fabrication methods for small packages usually scale down to a standard larger bottle design proportionally and reduce the amount of polymer used to make the small container and its preform. However, attempts to make smaller bottles with this approach often result in greater volume to surface area to volume ration than expected and a degraded shelf life. Therefore, there is a need for better bottle designs and methods that are useful for CSDs, particularly to provide small bottles that have shelf life properties that are practical for commercial use and in harsh, particularly hot, climates. It would preferable if such new bottle designs and methods could be applicable to a variety of container polymers such as nylons and nylon blends, and not just to PET containers. It would also be preferable if the new bottle designs and methods could be applicable to bottles that included barrier layers or coatings (internal or external) and/or multilayer containers.

SUMMARY

This disclosure provides generally new PET containers, methods, and designs for packaging carbonated beverages that provide surprisingly improved carbonation retention properties and greater shelf life, while achieving light weight, regardless of whether internal and/or external coatings are used. This disclosure is particularly drawn to small PET containers for carbonated beverages, for example less than or about 400 mL, with or without internal and/or external coatings, and methods and designs for their fabrication that attain unexpectedly good carbonation retention and shelf life. Preforms for the new containers are also provided, and methods for fabricating the novel PET bottles from the preforms are disclosed. This disclosure also describes bottles and methods affording improved creep performance, crystallinity, increasing the weight distribution efficiency (WDE), and design and shape optimization.

"Light weighting" a container reduces the total weight of polymer used to prepare the container, and while it often diminishes performance due to thinner container walls, this performance reduction is usually predictable and can be balanced by controlling the total polymer weight. However, particular problems arise when applying standard light weighting methods to small bottles that are generally about 400 mL or less, for example about 360 mL or less, as carbonation retention and shelf life suffer in a less predictable and more severe manner.

It has now been discovered that carbonation retention and shelf life can be dramatically improved, particularly with small (≤about 300 mL) containers, by increasing the weight distribution efficiency (WDE) of the container, that is, the extent to which how uniformly the weight is distributed over the entire container. This translates to matching the weight percentage and surface area percentage of each section of the entire container. It has also been unexpectedly discovered that when good weight distribution efficiency (WDE) of the container is combined with minimizing the proportion of amorphous (un-oriented) polymer, carbonation retention and shelf life are further improved beyond what one of ordinary skill would have expected. That is, specific and unexpected causes of diminished carbonation retention and reduced shelf life for small containers have been ascertained, and methods to overcome these problems have been discovered. The design and shape optimizations disclosed herein have also been found to provide improved creep performance. Unexpected and significant improvement in coating performance were observed when coatings were used in combination with the design and shape optimized bottles, as compared to coated bottles without shape and creep minimization at very low weights.

According to other aspects, it was further unexpectedly discovered that achieving high weight distribution efficiencies (WDE) and low proportions of amorphous or un-oriented material in the container, particularly in small containers, could be achieved by selectively reducing the amount of material in the preform neck straight, particularly when combined with reducing the diameter of the finish and the container opening. By "selectively" reducing the amount of material in the preform neck straight, the amount of material in the preform neck straight is reduced in higher proportion or percentage as compared to some other sections of the preform when the overall bottle is light weighted. This reduction of material works well when it is accompanied by reducing the diameter of the finish and container opening. These features are thought to contribute to achieving the low proportions of amorphous or un-oriented material in the container and the high weight distribution efficiencies (WDE), which leads to better carbonation retention and shelf life.

Further, it has also been unexpectedly discovered that selectively reducing the amount of material in the preform end cap in preference to other sections of the preform also contributes to achieving the low proportions of amorphous or un-oriented material and improved (higher) weight distribution efficiencies (WDE) in the container. Again, by "selectively" reducing the amount of material in the preform end cap, the amount of material in the end cap is reduced in higher proportion or percentage as compared to some other sections of the preform when the overall bottle is light weighted. This reduction of the amount material works well by reducing the diameter of the end cap and generally the preform body. These features are also thought to contribute to achieving the low proportions of amorphous or un-oriented material (and therefore increased crystalline content) in the container and the high weight distribution efficiencies (WDE), which affords better carbonation retention and shelf life.

According to a further aspect, selectively reducing the amount of material in both the preform neck straight and the preform end cap can achieve the low proportions of amorphous or un-oriented material (and therefore higher proportion of crystalline material) in the container and improved (higher) weight distribution efficiencies (WDE) in the container, and therefore affords improved carbonation retention and shelf life. While not intending to be bound by theory, this discovery of preform design parameters that led to enhanced shelf life in the stretch blow-molded container is thought to arise at least in part because the amount of un-stretched material in the neck straight and/or end cap have been limited or reduced with improved weight distribution efficiency (WDE), which accordingly enhances both the crystallinity (low amounts of amorphous polymer), orientation and provides lower overall weight. Thus, with a smaller preform OD, a higher stretch (both inside and outside hoop Stretch Ratio (SR)) is obtained, which results in increased crystallinity as measured using density gradient column as well as increased orientation.

In aspects of this disclosure, there are provided new containers, preforms, and methods that improve the overall weight distribution efficiency (WDE) of the container. This feature provides improved shelf life for containers such as polyethylene terephthalate (PET) containers used for packaging carbonated soft drinks (CSD).

According to this disclosure, there is provided a preform for a carbonated soft drink (CSD) container having an internal surface and an external surface, the preform comprising
   a) a polymer monolayer or multilayer;
   b) a neck finish less than or about 25 mm (T dimension); and
   c) a preform outside body diameter (OD) less than or about 19 mm, measured at the portion of the preform body immediately adjacent the end cap; and further
   d) the preform or CSD container can include or can be absent an internal and/or an external barrier coating to provide gas barrier enhancements for $CO_2$, $O_2$ and other gases within and without the container.

In an aspect, this preform can weigh less than or about 13 g and a container fabricated from the preform can have a volume less than or equal to 400 mL. By indicating that the preform outside diameter (OD) is measured at the portion of the preform body immediately adjacent the end cap, it is intended that when measuring the preform outside diameter, the measurement is made on the preform body, but as close to the end cap as possible before encountering any curvature associated with the end cap, as illustrated in the figures. In further aspects, the polymer of the preform can comprise or can be made of a nylon, a polyester, or a polyamide, including various blends and co-polymers thereof. For example, the polymer can comprises or can be made of a material selected from nylon MXD6, a nylon blend comprising nylon MXD6, PET, poly(trimethylene furan-2,5-dicarboxylate) (PTF), also called poly(propylene furan-2,5-dicarboxylate) (PPF), poly(trimethylene terephthalate) (PTT), a polyethylene naphthalate (PEN)/PET co-polymer, a PEN and PET blend, a poly Glycolic Acid (PGA), PEF, and PET blend.

According to aspects of this disclosure, the preform, such as the preform described immediately hereinabove, can further comprise any one or more of the following properties:
   a) a Finish ID/Preform OD Ratio from about 0.9 to about 1.2 and a preform weight of less than or about 13 g;
   b) a preform end cap diameter (mm) from about 14.25 mm to about 17.00 mm; and/or
   c) a preform end cap weight (g) less than or about 10% of preform weight or alternatively, less than or about 8% of preform weight.

Further according to this disclosure, there is also provided a Carbonated Soft Drink (CSD) container prepared from the preform described immediately above, the Carbonated Soft Drink (CSD) container having any one or more of the following properties:
   a) a difference between area distribution (%) and weight distribution (%) in the container base section, the container shoulder section (defined as the "top" section of FIG. 3), or both the container base and the container shoulder sections is less than 8%;
   b) a shelf life (elapsed time from 4.2 to 3.3 volumes $CO_2$) of greater than or about 50 days, for example, when the container is a 250 mL CSD bottle;
   c) a sectional area to weight ratio (A/W, $cm^2/g$) for any given section is within 25% of the overall surface area to weight (excluding finish) ratio;
   d) a weight distribution efficiency (WDE) greater than or about 95%;
   e) a container size less than or about 400 mL;
   f) a higher crystallinity (>9%) in the base area at any point adjacent to the gate (within from 5 mm to 15 mm distance from gate, as compared to the corresponding crystallinity (>9%) in the base area of a container made with standard 28 mm finish (crystallinity as specified herein was measured using density gradient technique); and/or
   g) a higher orientation (% Trans content >70%) in the base adjacent to the gate.

These and various other aspects and embodiments of this disclosure are illustrated in the drawings, examples, data, and detailed description that follow.

BRIEF DESCRIPTION OF THE DRAWINGS

FIG. 2 also illustrated where preform outer diameter is determined (35), namely at the preform body immediately adjacent the end cap, but before the body begins to curve and form the end cap. The standard finish dimensions T, I, and E are illustrated.

FIG. 4A is a comparative 12.0 g Hemi preform having a 28 mm finish. FIG. 4B is an 8.3 g Hemi (Design 1) and FIG. 4C is an 8.3 g Conical preform (Design 2), both used to prepare the small carbonated beverage packaging with enhanced shelf life properties according to this disclosure. The 8.3 g preform designs (Designs 1 and 2) are characterized by smaller end cap outer diameters and a smaller finish, features which result in improved gas barrier properties, bottle design, base design, and creep performance. For example, the 12.0 g Hemi preform (FIG. 4A) has a 17.23 mm outer diameter while the 8.3 g Hemi preform (FIG. 4B) has a 14.7 mm outer diameter.

| % trans = $((A_{1340\ cm-1}/A_{1410\ cm-1})/((A_{1340\ cm-1}/A_{1410\ cm-1}) + (A_{1370\ cm-1}/A_{1410\ cm-1})))*100$ | |
|---|---|
| A | Absorbance peak height |
| 1410 $cm^{-1}$ | Reference band |
| 1370 $cm^{-1}$ | Gauche band |
| 1340 $cm^{-1}$ | Trans band |

Figure 8:
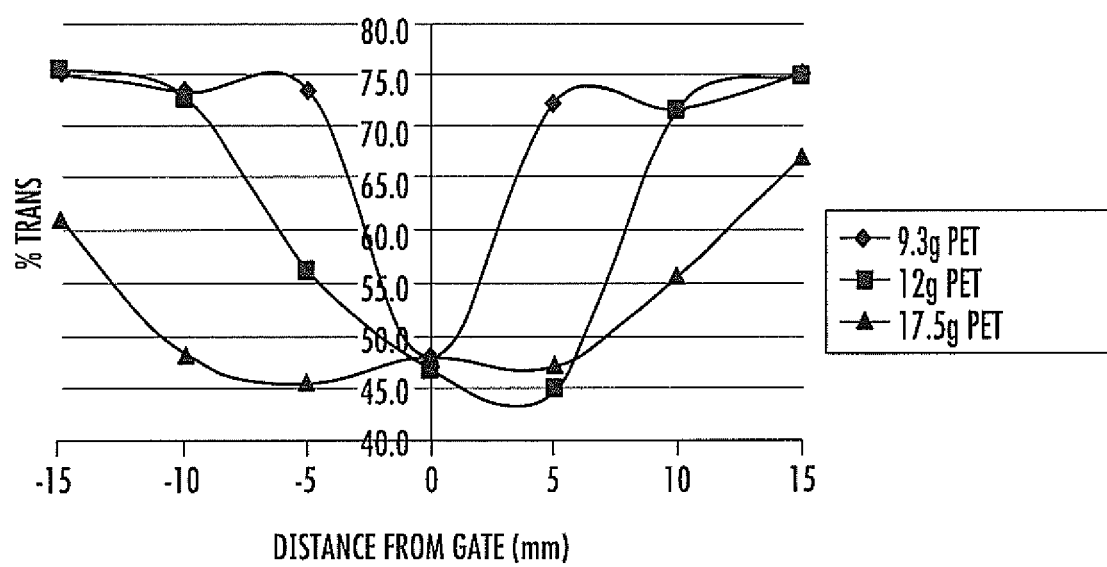
FIG. 8 illustrates the amount of orientation (% Trans content) in the base adjacent to the gate. Data for the following bottles are illustrated: 9.3 g, 200 mL new design (♦); 12 g PET bottle (■); and 17.5 g PET conventional bottle (▲). Trans (oriented) and Gauche (unoriented amorphous) content was measured using FTIR, and the % Trans was calculated as shown below. Specifically, the % Trans was measured at intervals of 5 mm from the gate as shown on FIG. 8. The measurement instrument used was PerkinElmer Spectrum 400 FT-NIR Spectrometer with ATR (attenuated total reflectance) capability.
Figure 9:
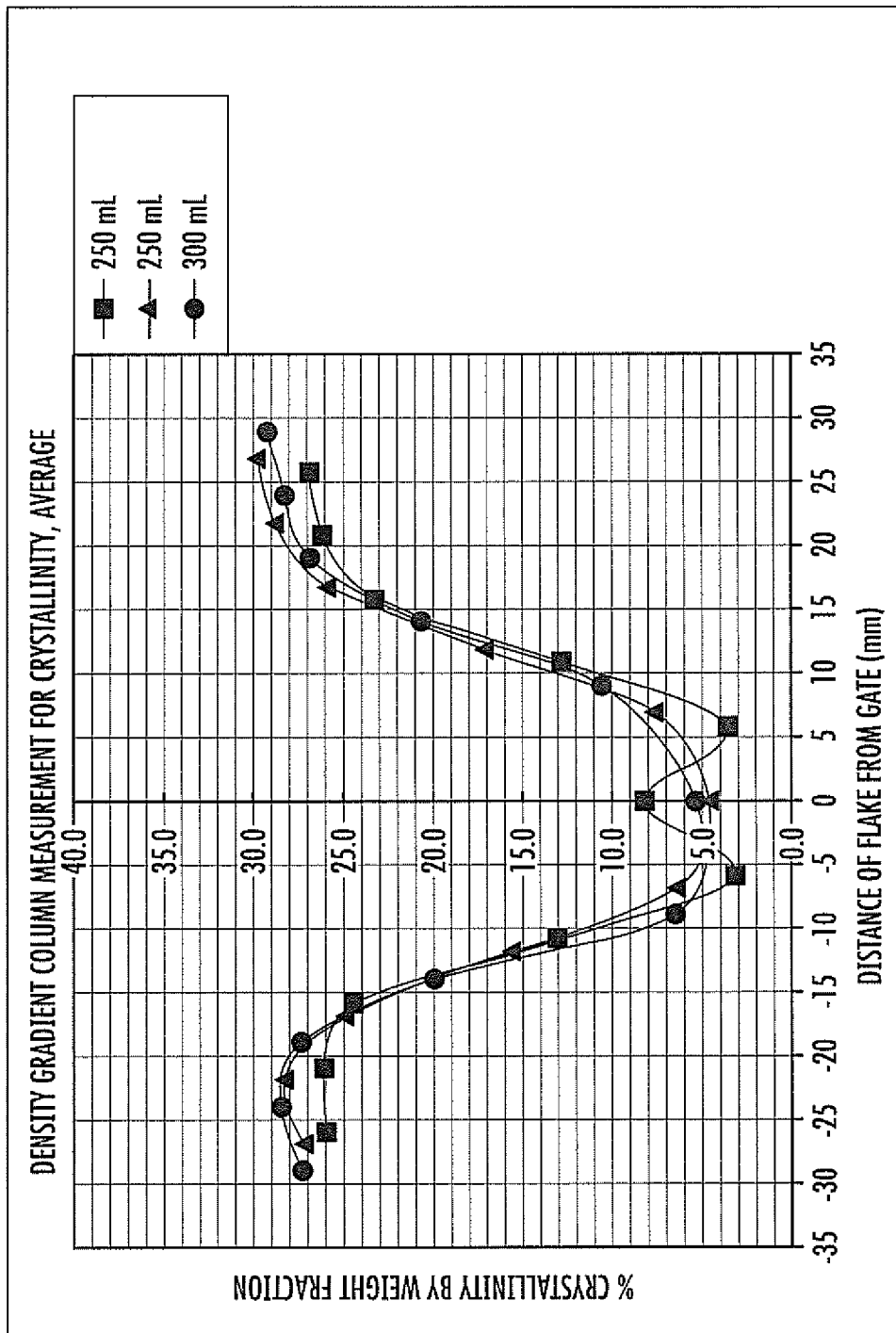

FIG. 9 illustrates the percent (%) crystallinity by weight fraction of bottles from FIG. 8 according to this disclosure, as a function of distance of the flake from the gate (in mm). The positive distance is for the flakes in the valley, and the negative distance is for the flakes in the bump of the bottle.

Figure 10:
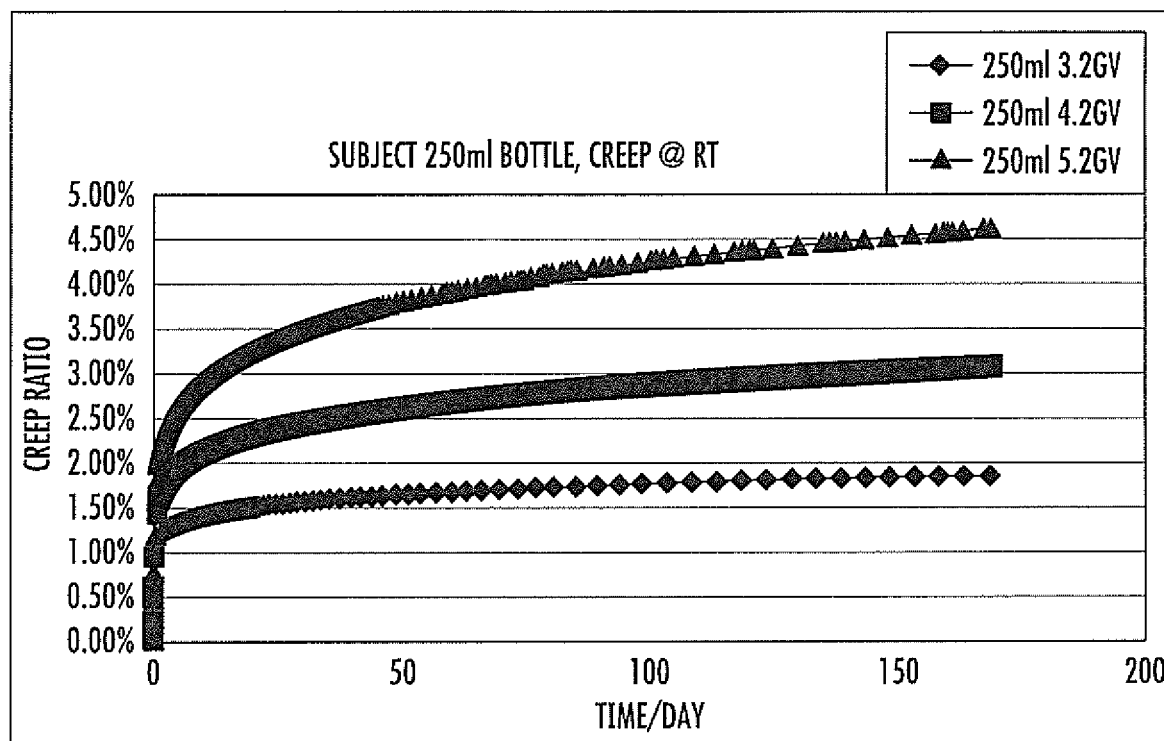
Figure 11:
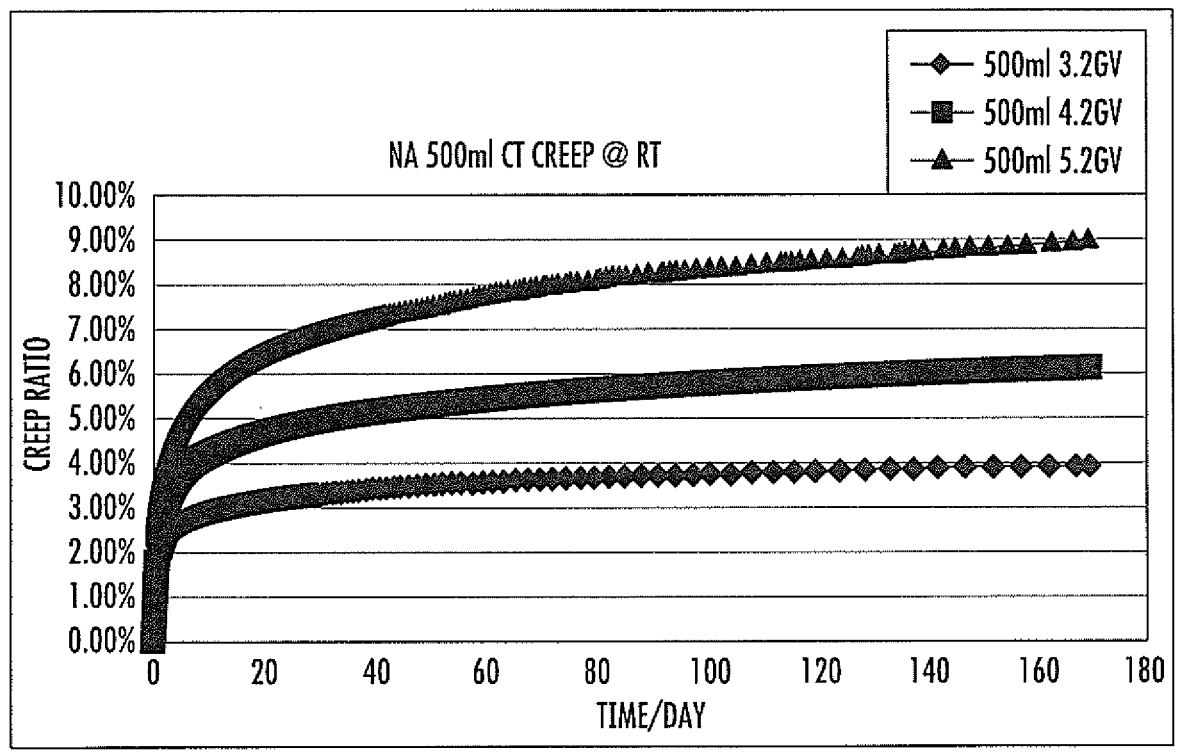

FIG. 10 illustrates the results from a creep study, by providing a plot of creep ratio (%) versus time (days) for a 250 mL inventive bottle according to this disclosure (GV is number of gas volumes), showing the significantly improved creep ratio as compared to the conventional contour bottle illustrated in FIG. 11.

FIG. 11 illustrates the results from a comparative creep study, by providing a plot of creep ratio (%) versus time (days) for a 500 mL conventional contour bottle (GV is number of gas volumes).

Figure 12A:
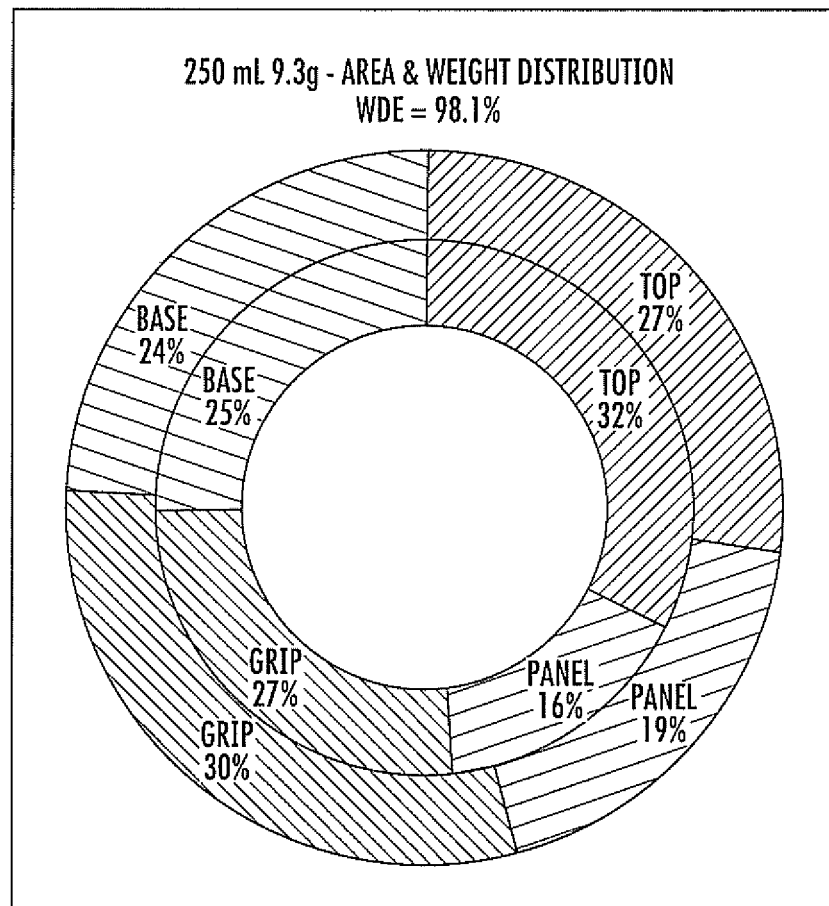
Figure 12B:
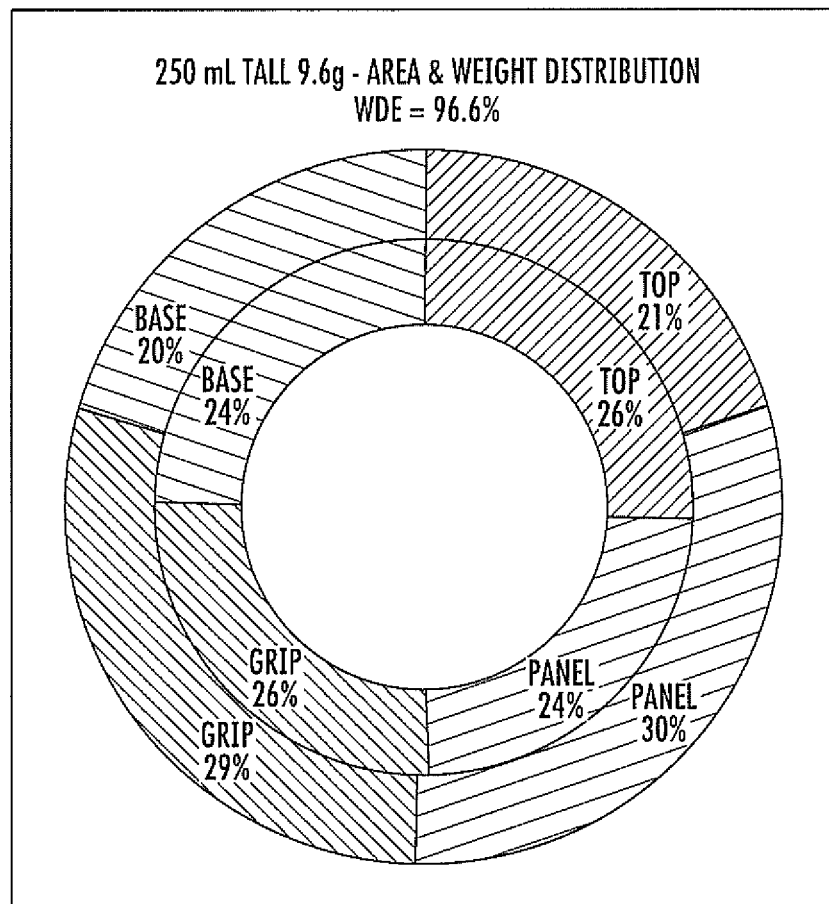
Figure 12C:
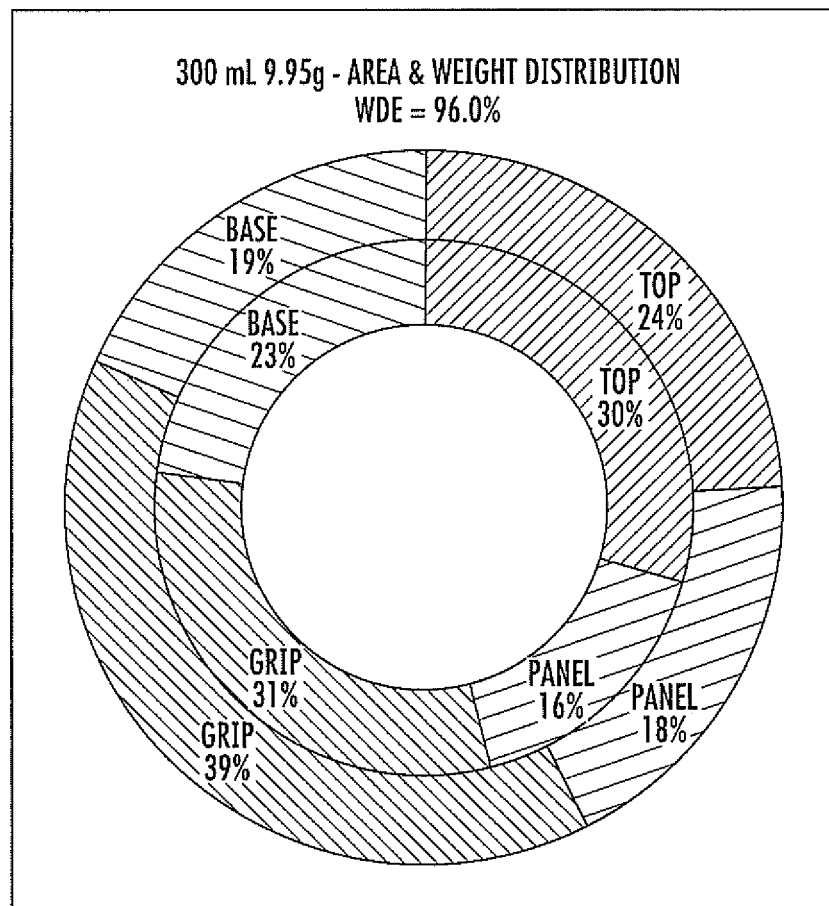

FIGS. 12A, 12B, and 12C illustrate the Weight Distribution Efficiency (WDE) for a 250 mL new design (9.3 g) bottle (FIG. 12A), a 250 mL new design (9.5 g) bottle (FIG. 12B), and a 300 mL new design (9.6 g) bottle (FIG. 12C). The inner ring of these graphs illustrates the weight distribution and the outer ring of these graphs illustrates the area distribution for each bottle.

DETAILED DESCRIPTION

Aspects of this disclosure provide for new containers, preforms, and methods that improve the overall weight distribution efficiency (WDE) and thermal stability of the container, particularly small containers less than or about 400 mL. In some aspects, the small containers are less than or about 360 mL; alternatively, less than or about 325 mL; alternatively, less than or about 250 mL; alternatively, less than or about 200 mL; or alternatively, less than or about 100 mL. For example, the new containers, preforms, and methods of this disclosure are generally applicable to small containers from about 100 to about 400 mL; alternatively, from about 200 to about 360 mL; or alternatively, from about 250 to about 325 mL.

These disclosed design features that lead to improved WDE in turn provide enhanced shelf life for PET containers used for packaging carbonated soft drinks (CSD). It has been found that by selectively reducing the amount of material in either or both the preform neck straight and the preform end cap, and/or by reducing the size (diameter) of the preform and container finish, WDE can be improved to at least about 95%, at least about 96%, or at least about 97%. This effect can be dramatic, particularly when reducing the base weight through preform design according to this disclosure. Moreover, this improved shape providing enhanced WDE also benefits creep performance and thereby further improves shelf life, whether the interior or exterior surface of the bottle includes a gas barrier coating or is absent such a coating. This selective reduction of material in the preform neck straight and/or end cap also can improve crystallinity distribution and polymer orientation in the neck and/or base for better performance, and generally promotes orientation in these hard to stretch areas. This lower proportions of un-oriented material in the container and higher WDE affords improved carbonation retention and shelf life, and creep can be reduced or minimized in small bottles fabricated accordingly.

The following definitions are provided to further explain and elaborate various aspects of this disclosure.

As used herein, "weight distribution efficiency" or WDE of a container calculated according to "Method A" is defined according to the formula:

$$WDE = \frac{\frac{A}{W}}{\sum_{i=1}^{i=n} \frac{a_i}{w_i} \times Ai}$$

wherein:
  $a_i$ is the area of the $i^{th}$ container section;
  $w_i$ is the weight of the $i^{th}$ container section;
  A is the total area of the container;
  $A_i$ is the area fraction for section i
  W is the total weight of the container; and
  i is one of n total sections into which the container is divided, each section equally spanning i/n of the total container height measured from the bottom of the base to the bottom of the support ring.

Figure 7:
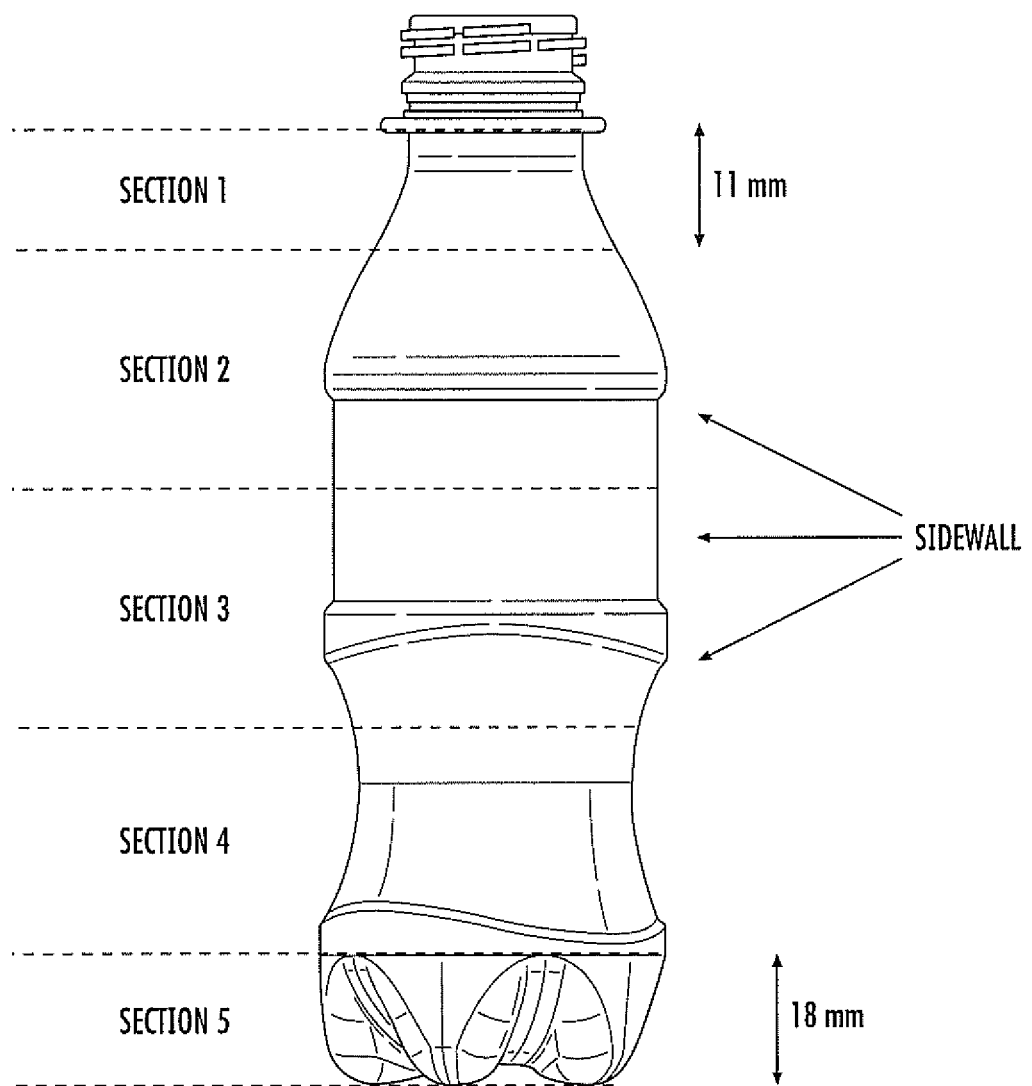
FIG. 7 illustrates the sectioning method for measuring the weight distribution efficiency (WDE) of a bottle according to Method A. In Method A for WDE determination, Sections 1 and 5 are cut at the locations shown in FIG. 7, namely, 11 mm and 18 mm from the support ring and the standing ring respectively. Sections 2, 3 and 4 are then generally cut into equal-height sections as shown.

Typically, when using Method A of calculating WDE, n will be 4, 5, or 6, although any number of sections can be used. That is, for the purposes of calculating WDE, there typically will be 4, 5, or 6 sections that are sectioned as illustrated in FIG. 7. Thus, in Method A, Sections 1 and 5 are cut at locations as shown in FIG. 7, specifically, at 11 mm and 18 mm from the support ring and the standing ring respectively. Then, Sections 2, 3 and 4 are cut into equal-height sections as shown in FIG. 7. All sections are then examined according to the Method A formula and used for the calculation in the WDE denominator, summed over all sections, and divided into A/W as indicated. Generally, WDE can be thought of as how closely the weight percentage of material present in any given section i of the container corresponds to the area percentage of the material used in that section. The closer WDE is to unity (100%), the more efficiently and even distributed the weight is based on the distribution of the area.

Alternatively, the "weight distribution efficiency" or WDE of a container calculated according to "Method B" is defined according to the formula:

$$WDE = \frac{\frac{A}{W}}{\sum_{i=1}^{i=4} \frac{a_i}{w_i} \times Ai}$$

wherein:
  $a_i$ is the area of the $i^{th}$ container section;
  $w_i$ is the weight of the $i^{th}$ container section;
  A is the total area of the container;
  Ai is the area fraction for section i
  W is the total weight of the container; and
  i is one of 4 total sections into which the container is divided, each section being designated as (from the bottom of the container): base, grip, panel, and top. Each of these sections is set out and demonstrated in FIG. 3 for a conventional bottle design. In this case, each of the 4 total sections do not necessarily equally span $\frac{1}{4}^{th}$ (corresponding to i/n of Method A) of the total container height measured from the bottom of the base to the bottom of the support ring. As FIG. 3 demonstrates, the 4 total sections below the finish into which the container is divided are the top, panel, grip, and base sections according to the structure of the bottle itself. The WDE percentages recited in this application are applicable to Method A, Method B, or both Method A and Method B.

Also as used herein, shelf life is determined according to $CO_2$ loss, and was either estimated using industry standard software or was measured. Shelf life measurements were carried out either using the Fourier Transform Infrared (FTIR) measurements of carbonation retention or by using a pressure probe and monitoring $CO_2$ pressure inside the container over a period of time. Both methods were used to extrapolate data to determine shelf life. In this disclosure "shelf life" is defined as the time required for $CO_2$ volumes in a container to drop to 3.3 volumes. Therefore, if there are 4.2 volumes of $CO_2$ in the container initially (t=0), the shelf life is the time required to attain a 21.4% loss in $CO_2$ volumes inside the packaged container from the time zero starting point with 4.2 volumes of $CO_2$ in the container. That is, the shelf life of that container is the time taken for the $CO_2$ volumes to reduce from the starting volumes of 4.2 volumes in this case down to 3.3 volumes, or a 21.4% decrease. If the starting volumes of $CO_2$ was 4.0 volumes, the shelf life would have to be measured as the time taken for a 17.5% drop in $CO_2$ volumes, that is, the time required for the $CO_2$ volumes to drop from the initial (t=0) 4.0 volumes to 3.3 volumes. For some tests, shelf life estimates were calculated using the M-RULE® Container Performance Model software package from Container Science, Inc. (CSI). This software is an industry standard for quickly estimating $CO_2$ and $O_2$ bottle shelf life performance characteristics of a container or package, without the delay and cost of performing traditional long-term shelf life tests.

"Crystallinity" and "percent crystallinity" measure the alignment or partial alignment of polymer chains in the fabricated bottle that result due to the preform design, structure, and composition, as well as fabrication methods such as mechanical stretching and cooling. More highly crystalline polymers are less permeable, exhibit lower creep and are generally more optically transparent. In this disclosure, crystallinity is generally reported as a percent and is measured by sampling the bottle at the base at known distances from the gate. Percent crystallinity is estimated according to density measurements using known methods, for example, as in ASTM D1505.

The term "Carbonated Soft Drink (CSD)" container is used herein to refer to the containers of this disclosure that are designed for use under pressure, such as carbonation, without specific limitation as to the intended contents of the container. Generally, the term "container" is used interchangeably with the term "bottle" unless the context requires otherwise.

Because many polymers used to prepare CSD containers are crystallizable, orientation and crystallinity factor into the polymer and bottle performance. For example, PET is crystallizable polyester that can exist in different morphology states, such as semi-crystalline in resin pellets, amorphous in preforms, and oriented-crystalline in blown containers. Both orientation and crystallinity generally improve the container performance. While not intending to be bound by theory, it is generally thought that crystallinity improves barrier performance by increasing the passive barrier (more tortuous path for gases to escape) and amorphous orientation improves barrier performance by increasing resistance to creep.

Factors affecting orientation include Resin IV, Stretch Ratios, Stretching Speed and Stretching Temperature. In one aspect, this disclosure provides stretch ratios tailored to allow a bottle to be blown at the right blow temperature (without haze or pearlescence) to obtain maximum orientation and strain-induced crystallinity. Increasing the blow temperature generally increases crystallinity but reduces the amorphous orientation that will impact creep performance. According to an aspect of this disclosure, for the small packages described herein, the following stretch ratios were generally used: Axial Stretch Ratio: 2.8-3.0; Hoop Stretch Ratio (Inside): 5.2-5.6; Areal Stretch Ratio: 14-17.

A further aspect of the preforms and CSD bottles and their associated methods is improving creep performance, and this disclosure provides methods for fabricating light-weight container is to reduce or minimize creep. For example, in an aspect, creep can be reduced or minimized by maximizing orientation and achieving strain hardening during the blowing process. It is thought that these features lead to more uniform material distribution along the container contour length and helps to minimize creep. Reducing creep also generally means lower headspace which in turn reduces the amount of $CO_2$ escaping into the headspace from the liquid, features that help increase shelf life. Stress acting on the sidewall is proportional to the diameter of the container and inversely proportional to thickness. Also for coated containers, it is important to minimize creep as too much local elongation can initiate cracking of the coating and compromise BIF (Barrier Improvement Factor) achieved by coating.

In order to characterize the impact of stretch ratio on physical performance (burst, creep, top load) the 200 mL container was used as a reference container to evaluate different stretch ratios (preform designs) and their impact on physical performance. The following table summarizes characteristic ratios and performance.

TABLE 1

Effect of preform stretch ratios on creep

| | Preform P1 | | | Preform P2 | | | Preform P3 | | |
|---|---|---|---|---|---|---|---|---|---|
| BO ratios | lg: 3.05 | Ø: 3.59 feet: 3.47 | BO: 11.58 | lg: 3.32 | Ø: 4.00 feet: 3.73 | BO: 13.28 | lg: 3.14 | Ø: 4.45 feet: 4.38 | BO: 14 |
| Vortex | | No | | | No | | | No | |
| Rh | | 2032 | | | 2348 | | | 1204 | |
| Output | | 2000 | | | 2000 | | | 2000 | |

| | Min | Average | Max | Min | Average | Max | Min | Average | Max |
|---|---|---|---|---|---|---|---|---|---|
| Performances Burst | 15.4 | 17.2 | 17.7 | 13.9 | 18.4 | 16.9 | 14.8 | 15.4 | 16 |
| Empty Top Load | 9.1 | 9.6 | 9.8 | 8.7 | 9.1 | 9.5 | 6.4 | 8.6 | 8.9 |
| Vacuum | 90 | 92 | 93 | 102 | 103 | 104 | 93 | 93 | 93 |
| Creep Height | 1.1 | 1.1 | 1.2 | 0.7 | 0.9 | 1.1 | 1.1 | 1.3 | 1.4 |
| Creep Dim 1 | −0.2 | −0.1 | 0 | 0 | 0.1 | 0.2 | 0 | 0.4 | 0.6 |
| Creep Dim 2 | 1 | 1.7 | 1.9 | 1.3 | 1.7 | 2 | 1.2 | 1.8 | 2.2 |
| Creep Dim 3 | −0.4 | −0.4 | −0.4 | 0.1 | −0.1 | 0.3 | 0 | −0.3 | −0.6 |
| Creep Dim 4 | 3.7 | 4.1 | 4.2 | 1.7 | 2.1 | 2.7 | 1.5 | 2.5 | 3.2 |
| Inside Hoop Stretch Ratio | | 4.87 | | | 5.25 | | | 6.12 | |
| Inside Pinch Ratio | | 3.94 | | | 4.25 | | | 4.96 | |
| Outside Pinch Ratio | | 2.6 | | | 2.61 | | | 2.83 | |

| | Preform P4 | | | Preform P5 | | | Preform P6 | | |
|---|---|---|---|---|---|---|---|---|---|
| BO ratios | lg: 3.14 | Ø: 4.45 feet: 4.35 | BO: 14 | lg: 3.13 | Ø: 4.25 feet: 4.02 | BO: 13.3 | lg: 3.83 | Ø: 3.40 feet: 3.07 | BO: 13.51 |
| Vortex | | Yes | | | No | | | No | |
| Rh | | 1204 | | | 1600 | | | 1437 | |
| Output | | 2000 | | | 2000 | | | 2000 | |

| | Min | Average | Max | Min | Average | Max | Min | Average | Max |
|---|---|---|---|---|---|---|---|---|---|
| Performances Burst | 15.1 | 15.5 | 15.7 | 16.9 | 17.3 | 17.6 | 12.1 | 13.4 | 14.5 |
| Empty Top Load | 8 | 8.3 | 8.5 | 8.4 | 8.8 | 9 | 9.6 | 10.5 | 10.9 |
| Vacuum | 85 | 85 | 85 | 87 | 92 | 95 | 107 | 108 | 109 |
| Creep Height | 1.4 | 1.4 | 1.5 | 1.2 | 1.3 | 1.3 | 0.9 | 1.2 | 1.4 |
| Creep Dim 1 | 0.3 | 0.4 | 0.6 | 0 | 0.1 | 0.2 | 0.2 | 0.5 | 0.6 |
| Creep Dim 2 | 1.8 | 1.9 | 2.1 | 1.6 | 1.7 | 1.9 | 2.1 | 2.3 | 2.4 |
| Creep Dim 3 | −0.1 | −0.2 | −0.3 | −0.3 | −0.4 | −0.7 | 0 | 0.2 | 0.4 |
| Creep Dim 4 | 2.1 | 2.8 | 3 | 2.2 | 2.4 | 2.6 | 3.1 | 4 | 4.8 |
| Inside Hoop Stretch Ratio | | 6.12 | | | 5.64 | | | 4.37 | |
| Inside Pinch Ratio | | 4.96 | | | 4.57 | | | 3.54 | |
| Outside Pinch Ratio | | 2.83 | | | 3.4 | | | 2.24 | |

Table 2 illustrates the effect of preform stretch ratios on creep. Creep dimension 4 (dim 4) corresponds to pinch diameter. As seen, an identical container design blown with different preforms (stretch ratios) results in creep varying from 2.1 to 4.1% (almost 100% more), highlighting the effect that preform design can have on local creep in the pinch area. It is also seen that macroscopic physical performance characteristics such as Top Load or Burst pressure do not provide particularly reliable indicators of local creep performance in these small bottles. Characteristic stretch ratios calculated in the local area (pinch) seem to have a good correlation with local creep. In an aspect, having an inside hoop stretch ratio in the range of about 5.2-5.7 and inside pinch ratio in the range of about 4.2-4.6 result in good creep performance for a given container design.

The following table summarizes some preform parameters for different small bottle designs that have been found to assist in providing good creep resistance, gas barrier performance, and weight distribution efficiency (WDE). The exemplary data in this table illustrates the relationship between bottle size (weight) and end cap OD, and a good stretch ratio window for axial and hoop stretch for providing the different small bottle designs.

TABLE 2

Exemplary preform parameters for different small bottle designs

Preform Information

| Container Description | Max ID, mm | Min ID, mm | End Cap OD, mm | Finish Height, mm | Preform Length, mm | Preform ½ Length, mm |
|---|---|---|---|---|---|---|
| 200 mL New PET Design 1 | 9.9 | 9.63 | 14.93 | 12.8 | 64.44 | 55 54 |
| 350 mL New PET Design 1 | 12.04 | 11.72 | 17.96 | 12.8 | 73.71 | 63.92 |
| 250 mL New PET Design 1 | 9.9 | 9.64 | 15.68 | 14.8 | 66.74 | 55.99 |
| 250 mL New PET Design 2 | 9.81 | 9 52 | 15.37 | 13 3 | 69 | 59.77 |
| 300 mL New PET Design 2 | 10 | 9.67 | 15.22 | 13.3 | 74 | 64.7 |

The design principles of this disclosure can also provide improvements in container burst pressure, percent volume expansion, and the like. The following table illustrates some of the new containers and their physical properties.

TABLE 4

Selected new container designs and their physical properties

| Bottle ID | Bottle Weight, g | Burst Pressure, psi | % volume expansion @ 135 psi, 13 s | Fill point Drop, mm |
|---|---|---|---|---|
| 200 mL PET New Design | 8.3 | 229 | 4.5 | |
| 250 mL PET New Design | 9.3 | 224 | 5.2 | 11.5 |

The following table also illustrates some 250 mL PET New design containers and their physical properties. This data illustrates that there is a correlation between physical performance and Shelf-Life. Generally, the higher the volume expansion (and fill point drop), the lower the shelf-life. These data demonstrate the impact of creep (and how it affects coating) and therefore the shelf-life. The percent (%) volume expansion is the amount that a bottle expands when it is pressurized to 135 psi and held at that pressure for 13 s.

TABLE 5

Selected 250 mL PET new design containers and their physical properties

| Attributes | V3 - PTI | V4-FP | V4-IFP |
|---|---|---|---|
| Physical Performance | | | |
| Burst Pressure, psi | 224.5 | 210 | 194 |
| % Volume Expansion | 5.2 | 7 | 10 |
| Thermal - % Change Pinch | 2.13 | 3.6 | 6.9 |
| Fill Point Drop, mm | 11 | 13.6 | 15.9 |
| OTR, cc/pkg/day | | | |
| Before Creep | 0.001 | | |
| After Creep @ 38 C. | 0.005 | 0.004 | 0.0044 |
| Shelf-Life @ 30 Deg C., days | 228 | 185 | 132 |

Also as provided herein, it has also been discovered that carbonation retention and shelf life can be dramatically improved with small (≤about 400 mL and particularly, ≤300 mL) containers, by increasing the weight distribution efficiency (WDE) of the container, that is, the extent of how uniformly the weight is distributed over the entire container. That is, matching the weight percentage and surface area percentage of each section of the entire container. When good weight distribution efficiency (WDE) of the container is combined with minimizing the proportion of amorphous (un-oriented) polymer as described above, carbonation retention and shelf life are further improved beyond what one of ordinary skill would have expected. The design and shape improvements disclosed herein have also been found to provide enhanced creep performance. Unexpected and significant improvement in coating performance were observed when coatings were used in combination with the design and shape optimized bottles, as compared to coated bottles without shape and creep minimization at very low weights.

Figure 2:
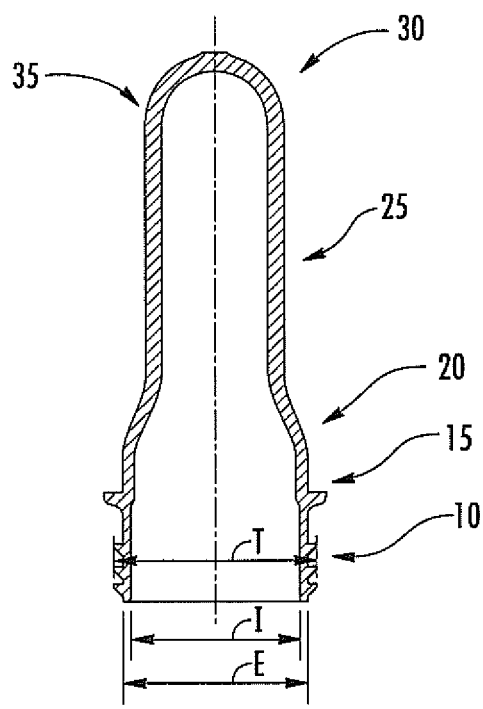
FIG. 2 provides a sectional view of a preform for reference, illustrating the different sections that are referred to in this disclosure. Starting from the threaded portion at the bottom of FIG. 2, these sections are the finish (10), neck straight (15), transition (20), body (25), and end cap (30) at the bottom or base of the preform (at the top of FIG. 2).

Regarding weight distribution efficiency (WDE) of a container, reference is made to FIG. 2, which sets out the different sections of a conventional preform that are referred to in this disclosure. These sections are generally referred to, starting from the bottom (base): the end cap, body, transition, neck straight, and finish. It has been discovered that the disparities in stretch performance among these sections was most severe in the end cap and the neck straight, as these were more difficult to stretch.

Therefore, potential areas for the reducing weight of the container were particularly identified to be in the end cap, transition, neck straight, and the finish. According to an aspect, this disclosure provides for reducing the size (diameter) of a conventional finish to smaller diameters to prepare a light-weight container. For example, a current PCO 1881 finish for CSD containers weighs 3.8 g. By reducing the PCO 1881 finish diameter from 28 mm down to 24, 22, or 20 mm, there is opportunity to reduce finish weight and overall containers weight. The data in the following table demonstrates the expected weight reduction upon reducing the finish diameter from 28 mm down to 24, 22, and 20 mm. It is seen that even modest reductions in finish diameter result in substantial reductions in finish weight.

TABLE 6

Calculated weight reduction in container finish upon reducing container opening size from the standard 28 mm opening.

| Opening Size (mm) | Finish Weight (g) |
| --- | --- |
| 28 | 3.80 |
| 24 | 2.50 |
| 22 | 2.13 |
| 20 | 1.87 |

Another benefit in reducing the finish diameter has also been discovered, namely that reducing the opening size also reduces the amount of un-stretched material in the neck straight. This aspect of container design parameters was found to be significant. For example, for a 28 mm finish with a 4 mm neck straight under the support ledge, the amount of PET material amounts to about 0.31 g. For a corresponding 22 mm neck finish with same neck 4 mm neck straight, the amount of PET material is reduced to only 0.18 g in the neck straight.

Figure 4C:
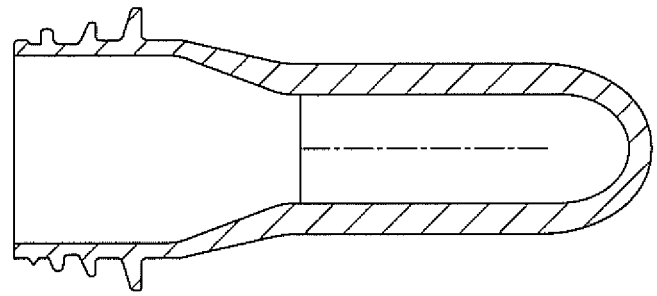
FIGS. 4A, 4B, and 4C illustrate exemplary and comparative preform designs.
Figure 4B:
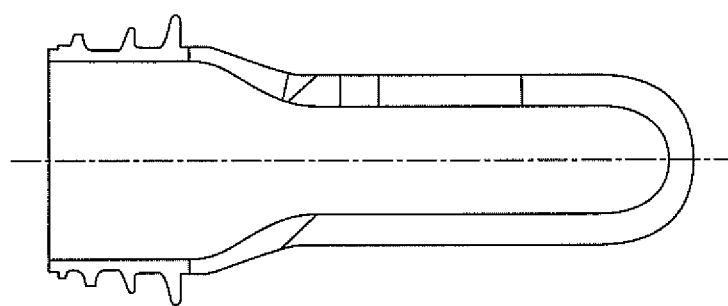
Figure 4A:
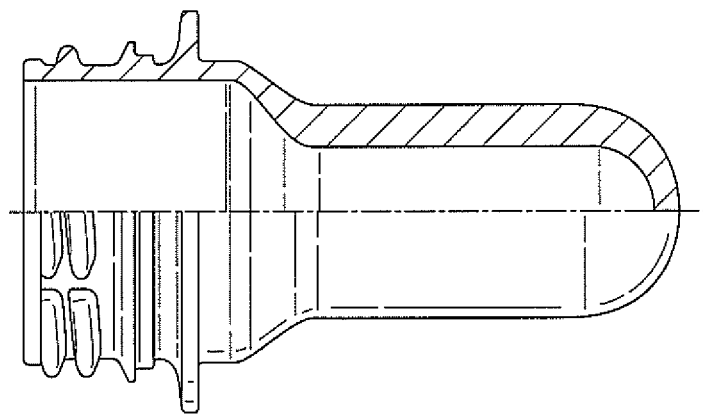

In addition to reducing the opening size which reduces the amount of un-stretched material, it was also discovered that performance enhancements could be gained upon reducing the overall preform and end cap outer diameter, which can be shown to lead to significant savings; see FIGS. 4A, 4B, and 4C. The 8.3 g "Hemi" preform design of FIG. 4B and "Conical" preform design of FIG. 4C are not merely smaller opening analogs of the 12.0 g Hemi conventional design of FIG. 4A. Instead, the 8.3 g preform designs are characterized by smaller end cap outer diameters, a feature which results in a reduction in the amount of un-stretched material in the end cap. The table below provides data showing the effect of reducing overall preform and end cap outer diameter, where the preform designs are set out in FIGS. 4A, 4B, and 4C.

TABLE 7

Effect of reducing overall preform (end cap) outer diameter (see FIGS. 4A, 4B, and 4C)

| Preform | Finish ID/ Preform OD Ratio | Preform End Cap Diameter (mm) | Preform End Cap Weight (g) |
| --- | --- | --- | --- |
| 12 g Hemi | 1.26 | 17.23 | 1.28 |
| 8.3 g Hemi (Design 1) | 1.16 | 14.70 | 0.84 |
| 8.3 g Conical (Design 2) | 1.14 | 14.93 | 0.56 |
| 9.3 g Conical (Design 3) | 1.08 | 15.68 | 0.67 |
| 10.3 g Conical (Design 4) | 1.04 | 16.26 | 0.73 |

Figure 5:
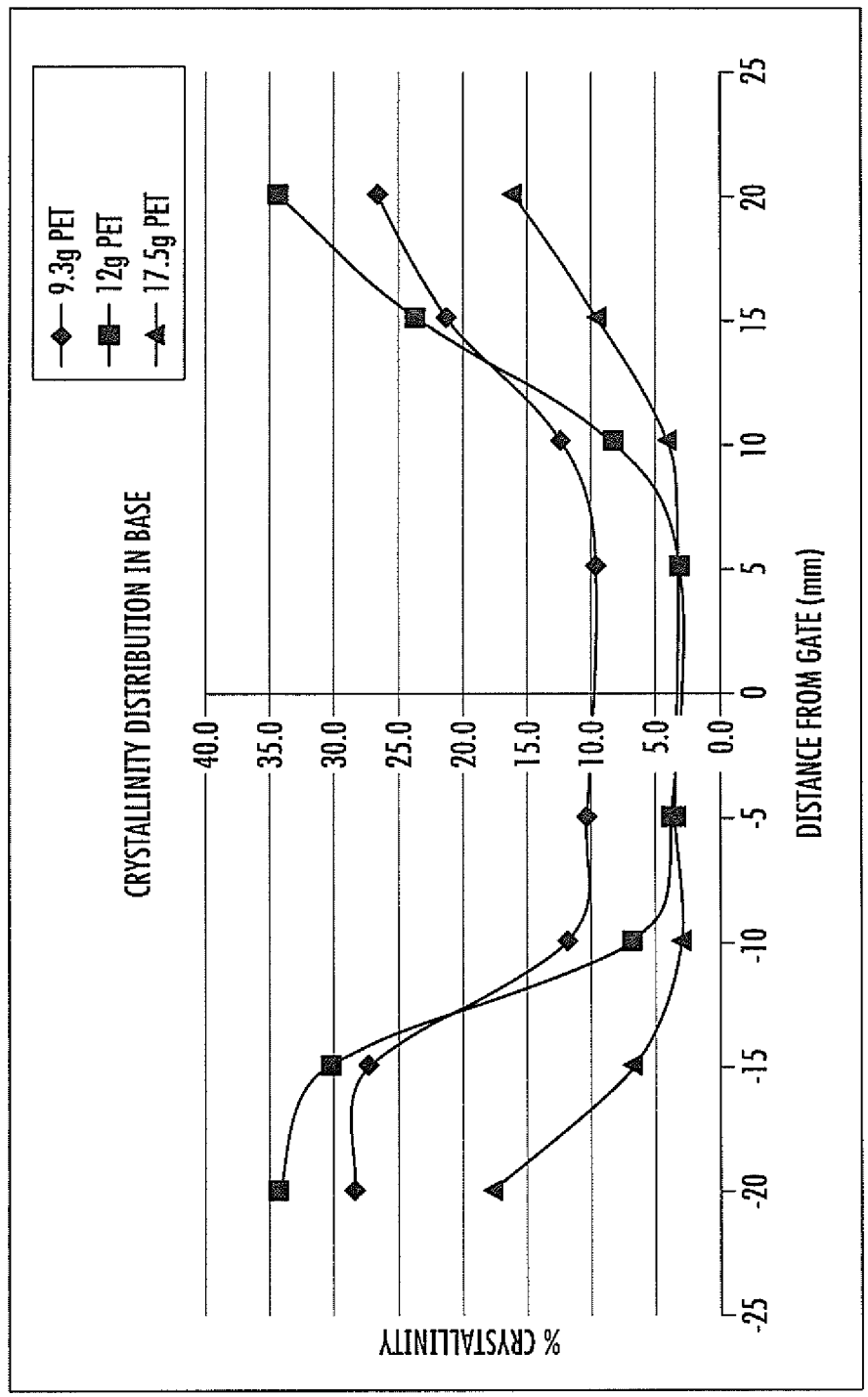
FIG. 5 illustrates a graph of percent (%) crystallinity in the base versus stance from the gate (mm) for bottle prepared according to Example 5 (9.3 g, 200 mL new PET design ♦) as compared with the crystallinity distribution in the base of two conventional PET bottles, a 12 g PET bottle (■) and a 17.5 g PET conventional bottle (▲), each having a 28 mm finish.

Thus, reducing the preform outer diameter (OD) also helps reduce the material in the end cap, which consequently allows for better stretching and a higher percent crystallinity and orientation in the base, features which is illustrated in FIG. 5. For example, and while not intending to be bound by theory, it has been discovered that it is not optimum to reduce the preform OD for a typical 28 mm finish as one might expect, because it was found that the relative amount of material in the transition (FIG. 2) increases, and this excess material will get trapped in the shoulder during stretch blow molding. The result will be a preform that leads to a container with a lower WDE than would otherwise have resulted with a smaller finish opening.

In addition, merely reducing the preform OD but retaining a typical 28 mm finish was found to also result in a thicker preform and higher hoop stretch, that is, both inside and outside hoop stretch ratios, adversely affecting the fabrication process by narrowing the process window. In contrast, using the preforms according to this disclosure having a smaller preform OD allows better stretching of the material in the base. This smaller preform OD and improved stretching in the base has been found to require a smaller opening size, as explained above. Reducing the smaller opening along with reducing the preform OD also gives flexibility to tailor stretch ratios needed to optimize material distribution and orientation by avoiding narrow process conditions.

Accordingly, features of this disclosure that provide the enhanced beverage shelf life for carbonate beverages include, for example, improving the usage of available material by optimizing the preform design to ensure there is minimum amount of amorphous or un-oriented material in the container. This has been found to be possible by the combination of employing a smaller opening (less than 28 mm) along with reducing the preform OD, which provides flexibility to tailor stretch ratios, reduces the amount of material in the preform end cap and neck straight, and provides a high weight distribution efficiency (WDE).

According to an aspect, the weight distribution efficiency (WDE) of a CSD container fabricated according to this disclosure can be greater than or about 95%; alternatively, greater than or about 96%; alternatively, greater than or about 97%; alternatively, greater than or about 98%; alternatively, greater than or about 99%; or alternatively, about 100%.

According to further aspects, the finish ID (inner diameter)/preform OD (outer diameter) ratio of the preforms and containers of this disclosure can be about 0.90 to about 1.20. For example, finish ID/preform OD ratio can be about 0.90, 0.95, 1.00, 1.05, 1.10, 1.15, or 1.20, including any ranges or sub ranges between any of these values.

Yet further aspects provided by this disclosure are the surface area per weight measurements for the CSD containers described herein. For example, the surface area per weight (SA:W) can be about 3000 square mm per gram ($mm^2/g$) or more. Alternatively, the SA:W can be about 3025 $mm^2/g$ or more, about 3050 $mm^2/g$ or more, about 3075 $mm^2/g$ or more, about 3100 $mm^2/g$ or more, about 3150 $mm^2/g$ or more, about 3200 $mm^2/g$ or more, about 3250 $mm^2/g$ or more, about 3300 $mm^2/g$ or more, about 3350 $mm^2/g$ or more, about 3400 $mm^2/g$ or more, about 3450 $mm^2/g$ or more, about 3500 $mm^2/g$ or more.

In additional aspects, it is noted that the disclosed bottles having improved material distribution according to this disclosure also maintain good creep performance, even though the bottles are substantially lighter in weight than conventionally designed bottles of this volume. Examples of creep performance data are provided in the following table, where creep was determined in accordance with FEA simulation studies, while the recorded Shelf Life measurements are from experimental FTIR studies.

TABLE 8

Creep performance data and shelf life summary for containers according to this disclosure.

| Bottle Size & Weight | Shelf life (FTIR) | Volumetric Creep (%) (FEA Simulation) |
|---|---|---|
| 200 mL/8.3 g Example 3 | 41 days | 2.65 |
| 200 mL/9.3 g Example 4 | 54 days | 2.06 |
| 250 mL/9.3 g Example 5 | 50 days | 3.01 |

EXAMPLES

FTIR Method for Estimating Packaging $CO_2$ Shelf Life

Generally, the Fourier Transform Infrared (FTIR) method for estimating shelf life determines a package's $CO_2$ loss rate by quantitatively measuring the Near Infrared (NIR) absorbance of $CO_2$ at a known path length. In making these measurements, the brimful volume of a test bottle was determined, and a predetermined amount of solid $CO_2$ (dry ice) was measured and added to 12 test bottles, which were then closed with an appropriate selected closure. Each filled bottle's diameter was determined at 86 mm from the base, and $CO_2$ absorbance (FTIR) was measured to establish an initial $CO_2$ concentration. Test bottles were stored in an environmental chamber at 22±1° C. and 50% RH. Over the course of the subsequent 49 days, 9 additional FTIR measurements were made. The percent loss of $CO_2$ concentration as a function of time was extrapolated to provide a slope corresponding to rate of $CO_2$ loss/(day or week). As described hereinabove, the package shelf life was determined by calculating the number of days or weeks required for an initial 4.2 volumes $CO_2$ in the filled packaging to reach 3.3 volumes carbonation, regardless of whether the bottle is a coated or uncoated bottle. The appropriate amount of dry ice for 4.2 volumes $CO_2$ was calculated from the bottle brimful volume in mL according to the following formula:

Dry Ice Weight (g) =

(Bottle brimful volume in ML) × (0.0077g/mL) × (Desired $CO_2$ psi/56psi)

Additional tests were conducted using a combination of the predetermined amount of measured solid $CO_2$ along with a small volume of water, and others with carbonated water.

Example 1. Shelf Life Measurements of Conventional Small Bottles

Shelf life values for currently used small bottles were measured and used as a benchmark for comparison with containers designed and prepared according to this disclosure. The following table reports the volumes and weights of the current commercial containers and their respective shelf life performance.

TABLE 9

Shelf life measurements (FT-IR) of small test bottles in commercial use.

| Parameter | Example 1A 200 mL | Example 1B 300 mL | Example 1C 200 mL |
|---|---|---|---|
| Weight (g) | 12 | 17.5 | 17.5 |
| Shelf life (days) at 72° F. | 47 | 65 | 57 |
| WDE (%) (Method B) | 90.6 | 94.2 | 85.2 |
| Thermal Stability, Height (%) | 1.68 | 1.27 | 1.54 |
| Thermal Stability, Mid Panel (%) | 3.17 | 2.00 | 1.45 |

The reduction in shelf life when using the same weight of polymer (17.5 g) but reducing the container size from Example 1B to Example 1C is substantial.

Example 2. Shelf Life Calculations of Proportionally Scaled-Down Containers

In order to demonstrate the impact on shelf life of conventional fabrication methods for small packages, performance modeling software was used to estimate shelf life upon scaling down a standard design of a larger bottle proportionally by reducing the amount of polymer used to make the small container and its preform, as follows. Shelf life was estimated using the M-RULE® Container Performance Model software package from Container Science, Inc. (CSI), which is the industry standard for quickly estimating $CO_2$ and $O_2$ bottle shelf life performance characteristics of a container or package.

Figure 1:
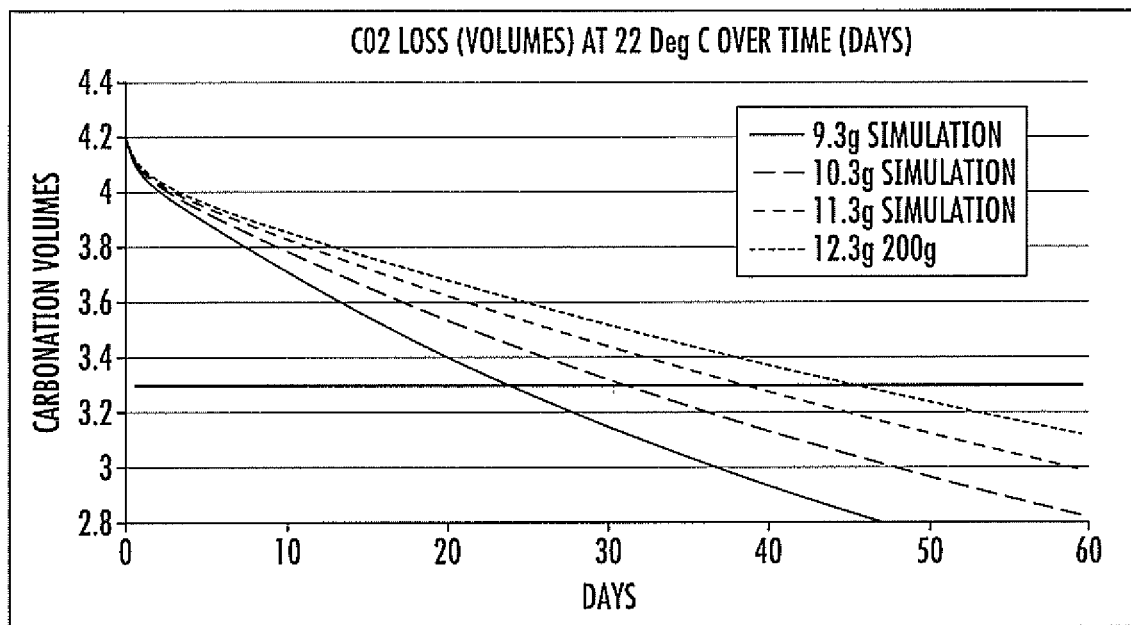
FIG. 1 illustrates shelf life calculations (M-RULE® Container Performance Model software package) as $CO_2$ loss (volumes) versus time (days) of a standard design larger bottle and lighter weight bottles prepared upon scaling down the standard design larger bottle proportionally by reducing the amount of polymer used to make the small container and its preform. A nominal 12 g, 200 mL PET standard design was the standard or conventional bottle, and corresponding bottles were reduced in weight in 1.0 g increments for subsequent calculations. Shelf life is determined by the elapsed time to lose $CO_2$ from a starting value of 4.2 volumes to 3.3 volumes, regardless of whether the bottle is a coated or uncoated bottle.

A 12 g, 200 mL standard test bottle was used for the analysis. The following table and FIG. 1 summarize the shelf life calculations when the weight of the 12 g standard test bottle was decreased in increments of 1.0 g.

TABLE 10

Shelf life calculations of a scaled-down 12 g, 200 mL standard test bottle

| Weight (g) | Calculated Shelf life (days) | Average Thickness (mm) |
|---|---|---|
| 12.3 | 45.3 | 0.20 |
| 11.3 | 38.2 | 0.18 |
| 10.3 | 31.0 | 0.15 |
| 9.3 | 23.8 | 0.12 |

These data demonstrate that light weighting by as little as 1 g has a significant adverse impact on shelf life. Reducing the weight of the 200 mL package by 3 g (24% less PET) would have a very substantial adverse impact on shelf life, reducing the shelf life by about 47% of its initial value. The dramatic loss of shelf life demonstrates the challenges of fabricating small packages and the need for alternative approaches, particularly when the economic and environmental pressures require light weighting.

Example 3. Shelf Life of a High WDE Small Bottle from Preform Design 2

Based on the design parameters set out in this disclosure, a small 8.3 g, 200 mL new design bottle was fabricated and subjected to weight distribution efficiency analysis (WDE) according to Method B. The preform parameters are as follows:

Preform end cap OD: 14.93 mm;
I/OD ratio: 1.14;
End cap weight: 0.56 g.

This preform is designated "8.3 g Conical (Design 2)" in the tables. Using this 8.3 g preform, 200 mL containers with a 22 mm finish were stretch-blow molded.

Figure 3:
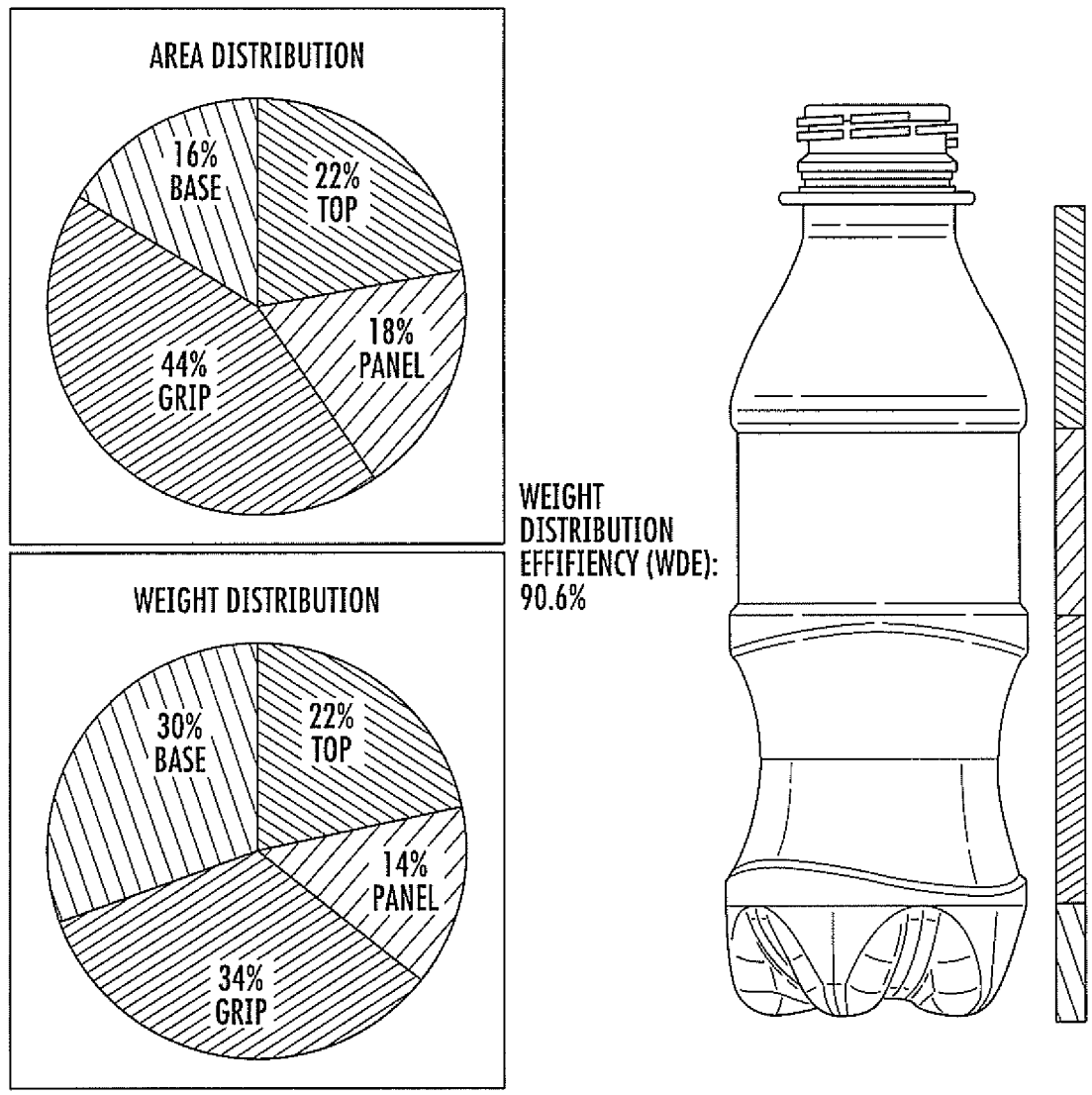
FIG. 3 illustrates the measurement of weight distribution efficiency (WDE) of a comparative light weight (12 g), 200 mL standard test bottle was used for the analysis, along with some data regarding its fabrication. This comparative bottle is a stretch blow-molded CSD bottle having a 26 mm PCO 1873 finish and a finish weight of 3.6 g, as shown at Example 1A. The figure illustrates the 4 total sections below the finish into which the container is divided when WDE is measured according to Method B: top, panel, grip, and base sections.

Weight distribution efficiency (WDE) and shelf life were measured to quantify performance. WDE was calculated based on sectioning the bottle into the four different sections according to Method B, base, grip, panel, and top, as illustrated in FIG. 3, and the area distribution and actual weights of each section were determined and are presented in the table below. The WDE of this container with a 22 mm finish was found to be 97%.

TABLE 11

Weight Distribution Efficiency Analysis (Method B) of 8.3 g, 200 mL PET New Design, stretch blow-molded from a Conical (Design 2) preform.

| Section | Weight Distribution (%) | Area Distribution (%) |
| --- | --- | --- |
| Top | 30 | 29 |
| Panel | 17 | 19 |
| Grip | 28 | 31 |
| Base | 25 | 21 |

Calculated WDE = 97%
M-RULE ® predicted shelf life = 31 days
Measured shelf life (FTIR) = 41 days The measured shelf life (FTIR method) of this container was surprisingly found to be 41 days, with an impermeable closure. This measured shelf life was compared to predicted (M-RULE®) shelf life for a 200 mL container with similar useable material (6.5 g under support ledge) with a 28 mm finish, with an impermeable closure, which was estimated to be 31 days.

While not intending to be theory bound, it is believed that this increased shelf life of 10 days additional gain was achieved because of better material distribution (WDE ~97%) and increased crystallinity and orientation in the base. Because permeability is a function of diffusion and solubility, increasing crystallinity, orientation and improved weight distribution reduces both solubility and diffusivity. In addition there is added benefit of slightly reduced closure surface area because of smaller opening size.

Example 4. Shelf Life of a High WDE Small Bottle from Preform Design 3

Based on the design parameters set out in this disclosure, a small 9.3 g, 200 mL new design bottle was fabricated and subjected to weight distribution efficiency analysis (WDE) according to Method B. The preform parameters are as follows:

Preform end cap OD: 15.68 mm;
I/OD ratio: 1.08;
End cap weight: 0.67 g.

This preform is designated "9.3 g Conical" in the tables. Using this 9.3 g preform, 200 mL containers with a 22 mm finish (1.8 g) were stretch-blow molded.

Weight distribution efficiency (WDE) and shelf life were measured to quantify performance. WDE was calculated based on sectioning the bottle into the four different sections according to Method B, base, grip, panel, and top, as illustrated in FIG. 3, and the area distribution and actual weights of each section were determined and are presented in the table below. The WDE of this container with a 22 mm finish was found to be 98%.

TABLE 12

Weight Distribution Efficiency Analysis (Method B) of 9.3 g, 200 mL New Design, stretch blow-molded from a Design 3 preform.

| Section | Weight Distribution (%) | Area Distribution (%) |
| --- | --- | --- |
| Top | 33 | 29 |
| Panel | 16 | 19 |
| Grip | 28 | 31 |
| Base | 23 | 21 |

Calculated WDE = 98%
M-RULE ® predicted shelf life = 38 days
Measured shelf life (FTIR) = 54 days The measured shelf life (FTIR method) of this container was surprisingly found to be 54 days, with an impermeable closure. This measured shelf life was compared to predicted (M-RULE®) shelf life for a 200 mL container with similar useable material (7.5 g under support ledge) with a 28 mm finish, with an impermeable closure, which was estimated to be 38 days.

Again, while not intending to be theory bound, it is believed that this increased shelf life of 16 days additional gain was achieved because of better material distribution (WDE ~98%) and increased crystallinity and orientation in the base. There is likely an added benefit of a slightly reduced closure surface area because of smaller opening size.

Example 5. Shelf Life of a 250 mL Small Bottle from Preform Design 3

Based on the design parameters set out in this disclosure, a small 9.3 g, 250 mL new design bottle was fabricated and subjected to weight distribution efficiency analysis (WDE) according to Method B. The preform parameters are as follows:

Preform end cap OD: 15.68 mm;
I/OD ratio: 1.08;
End cap weight: 0.67 g.

This preform is designated "9.3 g Conical" in the tables. Using this preform, 250 mL containers with a 22 mm finish (1.8 g finish weight) were stretch-blow molded.

Weight distribution efficiency (WDE) and shelf life were measured to quantify performance. WDE was calculated based on sectioning the bottle into the four different sections according to Method B, as illustrated in FIG. 3, and the area distribution and actual weights of each section were determined and are presented in the table below. The WDE of this container with a 22 mm finish was found to be 97%.

TABLE 13

Weight Distribution Efficiency Analysis (Method B) of 9.3 g, 250 mL New Design, stretch blow-molded from a Design 3 preform.

| Section | Weight Distribution (%) | Area Distribution (%) |
|---|---|---|
| Top | 32 | 27 |
| Panel | 16 | 19 |
| Grip | 27 | 30 |
| Base | 25 | 24 |

Calculated WDE = 97%
M-RULE ® predicted shelf life = 38 days
Measured shelf life (FTIR) = 50 days The measured shelf life (FTIR method) of this container was surprisingly found to be 50 days, with an impermeable closure. This measured shelf life was compared to predicted (M-RULE®) shelf life for a 250 mL container with similar useable material (7.5 g under support ledge) with a 28 mm finish, with an impermeable closure, which was estimated to be 38 days. Again, while not intending to be theory bound, it is believed that this increased shelf life was achieved because of better material distribution (WDE ~97%) and increased crystallinity and orientation in the base.

Example 6. Shelf Life of a 250 mL Small Bottle from Preform Design 4

Based on the design parameters set out in this disclosure, a small 10.3 g, 250 mL new design bottle was fabricated and subjected to weight distribution efficiency analysis (WDE) according to Method B. The preform parameters are as follows:

Preform end cap OD: 16.26 mm;

I/OD ratio: 1.04;

End cap weight: 0.73 g.

This preform is designated "10.3 g Conical" in the tables. Using this preform, 250 mL containers with a 22 mm finish were stretch-blow molded.

Weight distribution efficiency (WDE) and shelf life were measured to quantify performance. WDE was calculated based on sectioning the bottle into the four different sections according to Method B, as illustrated in FIG. 3, and the area distribution and actual weights of each section were determined and are presented in the table below. The WDE of this container with a 22 mm finish was found to be 99%.

TABLE 14

Weight Distribution Efficiency Analysis (Method B) of 10.3 g, 250 mL New Design, stretch blow-molded from a Design 4 preform.

| Section | Weight Distribution (%) | Area Distribution (%) |
|---|---|---|
| Top | 30 | 27 |
| Panel | 16 | 19 |
| Grip | 31 | 30 |
| Base | 23 | 24 |

Calculated WDE = 99%
M-RULE ® predicted shelf life = 45 days
Measured shelf life (FTIR) = 56 days The measured shelf life (FTIR method) of this container was surprisingly found to be 56 days, with an impermeable closure. This measured shelf life was compared to predicted (M-RULE®) shelf life for a 250 mL container with similar useable material (9.5 g under support ledge) with a 28 mm finish, with an impermeable closure, which was estimated to be 45 days.

Example 7. Crystallinity Distribution in a Container Base

The 9.3 g, 200 mL new design bottle prepared according to Example 4 was examined for its crystallinity distribution in the base, and compared with the crystallinity distribution in the base of two conventional PET bottles. Specifically, a 12 g PET bottle and a 17.5 g PET conventional bottle were compared, each having a 28 mm finish. Percent crystallinity was measured by sampling each bottle at the base at known distances from the gate, and estimating crystallinity (%) according to density measurements, as disclosed herein. The results are illustrated in FIG. 5.

The data in FIG. 5 illustrate that the 9.3 g, 200 mL new design bottle is characterized by approximately 10% crystallinity at the gate and several mm removed from the gate. By comparison, the conventional 12 g PET and 17.5 g PET bottles (28 mm finish) are characterized by approximately 3-4% crystallinity at the gate and several mm removed from the gate. This substantial improvement in the bottles fabricated according to this disclosure is an unexpected result of the design parameters set out herein.

Example 8. Comparison of Shelf Life of Disclosed Small Bottles with Same Weight and Equivalent Usable Weight Bottles with 28 mm Openings The table below sets out the measured shelf life of disclosed small bottles from Examples 3-5, and compares them to the estimated shelf life (M-RULE®) of the same weight bottle with a 28 mm opening, and that of an equivalent useable weight bottle with a 28 mm opening. Shelf life can be seen to improve from about 29% to about 35% in the inventive bottles as compared to the shelf life estimated in conventional bottles.

TABLE 15

Shelf Life Analysis and comparison for containers according to this disclosure.

| Bottle Size & Weight | Bottle with 22 mm Finish - Shelf life Measured using FTIR | M-RULE ® Model Prediction | | % Improvement in Shelf life over equivalent Bottle |
|---|---|---|---|---|
| | | Same weight bottle with 28 mm Opening | Equivalent useable weight bottle with 28 mm Opening | |
| 200 mL/8.3 g Example 3 | 41 days | 17 days | 31 days | 32.2% (10 days) |
| 200 mL/9.3 g Example 4 | 54 days | 24 days | 38 days | 42.1% (16 days) |

TABLE 15-continued

Shelf Life Analysis and comparison for containers according to this disclosure.

| | M-RULE ® Model Prediction | | | |
|---|---|---|---|---|
| Bottle Size & Weight | Bottle with 22 mm Finish - Shelf life Measured using FTIR | Same weight bottle with 28 mm Opening | Equivalent useable weight bottle with 28 mm Opening | % Improvement in Shelf life over equivalent Bottle |
| 250 mL/9.3 g Example 5 | 50 days | 23 days | 38 days | 31.6% (12 days) |
| 250 mL/10.3 g Example 6 | 56 days | 31 days | 45 days | 24.4% (11 days) |

Figure 6:
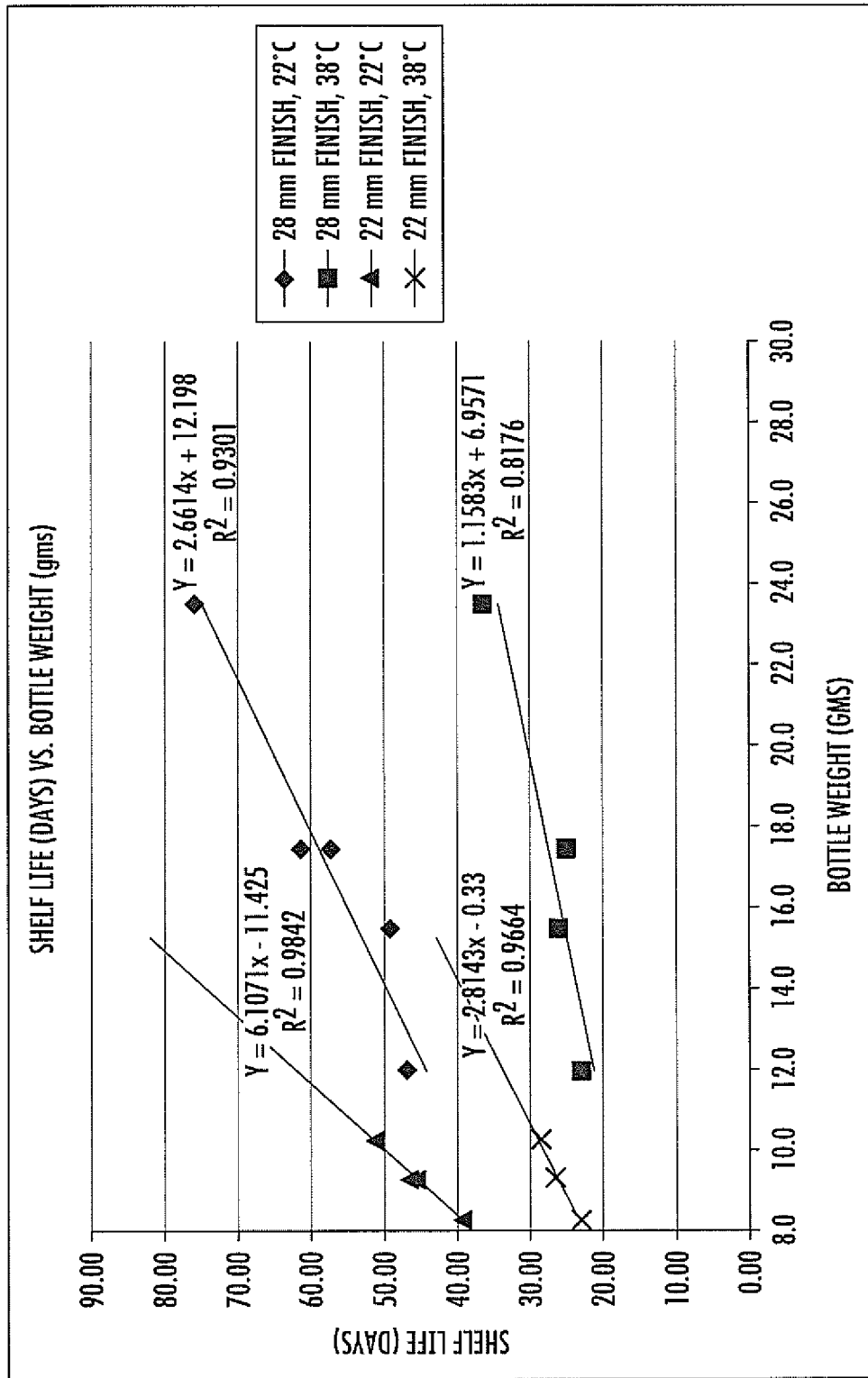
FIG. 6 plots the measured shelf life of small PET bottles versus bottle weights (8.0, 9.0, and 10.0 grams) for bottles having a 22 mm finish fabricated according to this disclosure, at 22° C. (▲) and at 38° C. (×). These shelf life measurements are compared in FIG. 6 to the measured shelf life of larger PET bottles versus bottle weights (12.0 grams and above) for bottles having a conventional 28 mm finish, also at 22° C. (♦) and at 38° C. (■).

Example 8. Comparison of Shelf Life Versus Bottle Weight for 22 mm Finish Bottles Versus 28 mm Finish Bottles at Different Temperatures FIG. 6 plots the measured shelf life of small PET bottles versus bottle weights (8.0, 9.0, and 10.0 grams) for bottles having a 22 mm finish fabricated according to this disclosure, at 22° C. (▲) and at 38° C. (×). These shelf life measurements are compared in FIG. 6 to the measured shelf life of larger PET bottles versus bottle weights (12.0 grams and above) for bottles having a conventional 28 mm finish (M-RULE®), also at 22° C. (◆) and at 38° C. (▲).

These data demonstrate that for small CSD packages (generally less than 300 mL), prior to this disclosure, it was not known how to make a package having a useful shelf life of 45 days or greater, using about 12 grams or less of monolayer (or multilayer) PET only. The FIG. 6 plot shows the measured shelf life for 28 mm finish containers at 22° C. (◆) and at 38° C. (■), demonstrating that prior art data shows it is not possible to make less than 12 grams CSD bottle having 45 days or longer shelf life using monolayer or multilayer PET only.

As demonstrated in the examples and data in this disclosure, using a designed bottle with neck finish less than or about 25 mm and/or preform diameters less than or about 15 mm, for example, bottles with a 22 mm neck finish from a preform with a diameter less than 15 mm, bottles at 9.3 grams weight can be fabricated having a shelf life of greater than or about 50 days.

Furthermore, from the FIG. 6 chart, the shelf life performance of CSD packages in higher temperature environments, as would be encountered in many countries around the globe, particularly tropical and sub-tropical regions, decrease significantly faster than at lower temperatures. Specifically, the M-RULE® predictive model based upon the prior art demonstrates that high temperature performance decreased 57% from 22° C. to 38° C., while the shelf life of CSD packages according to this disclosure decreased only 54%, based on the slope reduction.

It has further been shown that a CSD bottle can be prepared comprising a monolayer or multilayer of PET, having a shelf life in days (y) of greater than or about the shelf life using the following formula: y=(6.1×x)−25, wherein y is shelf life (days), and x is the weight of the bottle (grams). This formula is based on the FIG. 6 plot and the intercept from −25 as the curve shown intercept the y axis at −11. The shelf life has been improved over 14 days better than the best in class of 12 gram bottles shown in the graph of FIG. 6.

It has also been demonstrated that a CSD bottle can be prepared comprising a monolayer or multilayer of PET, having a shelf life of greater than or about 50 days, and a resin weight equal to or less than or about 12.0 grams; alternatively, less than or equal to or about 11.9 grams; or alternatively, less than or equal to or about 11.8 grams.

Example 9. $CO_2$ Loss and Shelf Life Comparisons for Coated Polyester Bottles Versus Control PET Bottles For the following tests, bottles identified as "SiOx" coated were used. These containers are PET bottles that are coated with a coating process, by which the inside of the PET bottle is coated with an ultra-thin protective layer of silicon oxide (silica), $SiO_x$. This coating is shown in the data below to enable a much greater shelf life based on the $CO_2$ loss data provided in the tables. The comparative PET bottles are equivalent to the SiOx bottles except they do not include the SiOx silica coating.

Other suitable coating materials include, for example, amorphous carbon or a diamond-like carbon material.

Example 10. Thermal Expansion and Creep Control Data for Disclosed Bottles and Test Bottles The following bottles were fabricated and tested in a series of thermal expansion tests, to compare the bottle designs according to this disclosure with bottles having different designs. The tables that follow set out the thermal expansion test results.

1. SiOx Control, 12 g, 1881 Finish, 200 mL;
2. New Design A (conventional), 8.3 g, 22 mm, 200 mL;
3. New Design B, 8.3 g, 22 mm, 200 mL;
4. New Design C, 8.3 g, 22 mm, 200 mL; and
5. New Design D, 9.3 g, 22 mm, 200 mL.

Tests were run using a $CO_2$ v/v of between about 3.9 to 4.2, and a temperature of between about 21-23° C. The following tables summarize the thermal expansion and creep control data for disclosed bottles and test bottles.

TABLE 16

Thermal Expansion Tests, Coating Control
SiOx, 200 mL, 12 g/1881 Finish

| After 48 Hours at 38° C. & 4 Hour Cooling | PerCent Change | Max. | Min. | Avg. | Std Dev. |
|---|---|---|---|---|---|
| Height | 0.40 | 125.09 | 124.23 | 124.74 | 0.45 |
| Dia @ 90 mm | 2.57 | 52.48 | 52.27 | 52.39 | 0.11 |
| Dia @ 38 mm | 2.68 | 52.57 | 52.34 | 52.45 | 0.12 |

TABLE 16-continued

Thermal Expansion Tests, Coating Control
SiOx, 200 mL, 12 g/1881 Finish

| After 48 Hours at 38° C. & 4 Hour Cooling | PerCent Change | Max. | Min. | Avg. | Std Dev. |
|---|---|---|---|---|---|
| Dia @ 20 mm | 2.09 | 51.95 | 51.82 | 51.89 | 0.07 |
| Initial $CO_2$ | | 4.5 | 3.9 | — | — |
| Final $CO_2$ | | 3.860 | 3.720 | 3.783 | 0.071 |

TABLE 17

Thermal Expansion Tests, New Bottle Design A
(conventional), 200 mL, 8.3 g/22 mm Finish

| After 48 Hours at 38° C. & 4 Hour Cooling | PerCent Change | Max. | Min. | Avg. | Std Dev. |
|---|---|---|---|---|---|
| Height | 0.69 | 143.85 | 143.54 | 143.71 | 0.16 |
| Dia @ 90 mm | 2.09 | 50.63 | 50.57 | 50.59 | 0.03 |
| Dia @ 38 mm | 7.21 | 47.77 | 47.70 | 47.73 | 0.04 |
| Dia @ 20 mm | 0.92 | 51.46 | 51.43 | 51.44 | 0.02 |
| Initial $CO_2$ | | 4.380 | 4.180 | 4.247 | 0.115 |
| Final $CO_2$ | | 3.92 | 3.86 | 3.90 | 0.03 |

TABLE 18

Thermal Expansion Tests, New Bottle Design B, 200 mL, 8.3 g/22 mm Finish

| After 48 Hours at 38° C. & 4 Hour Cooling | PerCent Change | Max. | Min. | Avg. | Std Dev. |
|---|---|---|---|---|---|
| Height | 1.13 | 143.45 | 143.35 | 143.40 | 0.07 |
| Dia @ 90 mm | 3.00 | 50.51 | 50.50 | 50.51 | 0.01 |
| Dia @ 38 mm | 3.36 | 47.16 | 47.15 | 47.16 | 0.01 |
| Dia @ 20 mm | 1.02 | 51.44 | 51.42 | 51.43 | 0.01 |
| Initial $CO_2$ | | 4.390 | 4.230 | 4.310 | 0.113 |
| Final $CO_2$ | | 4.01 | 3.98 | 4.00 | 0.02 |

TABLE 19

Thermal Expansion Tests, New Bottle Design C, 200 mL, 8.3 g/22 mm Finish

| After 48 Hours at 38° C. & 4 Hour Cooling | PerCent Change | Max. | Min. | Avg. | Std Dev. |
|---|---|---|---|---|---|
| Height | 1.04 | 144.54 | 144.28 | 144.42 | 0.13 |
| Dia @ 90 mm | 3.03 | 50.09 | 50.02 | 50.05 | 0.04 |
| Dia @ 38 mm | 4.00 | 48.30 | 48.19 | 48.23 | 0.06 |
| Dia @ 20 mm | 2.23 | 49.49 | 49.44 | 49.46 | 0.03 |

TABLE 19-continued

Thermal Expansion Tests, New Bottle Design C, 200 mL, 8.3 g/22 mm Finish

| After 48 Hours at 38° C. & 4 Hour Cooling | PerCent Change | Max. | Min. | Avg. | Std Dev. |
|---|---|---|---|---|---|
| Initial $CO_2$ | | 4.070 | 4.000 | 4.030 | 0.036 |
| Final $CO_2$ | | 3.93 | 3.84 | 3.87 | 0.05 |

TABLE 20

Thermal Expansion Tests, New Bottle Design D, 250 mL, 9.3 g/22 mm Finish

| After 48 Hours at 38° C. & 4 Hour Cooling | PerCent Change | Max. | Min. | Avg. | Std Dev. |
|---|---|---|---|---|---|
| Height | 1.30 | 147.14 | 146.99 | 147.05 | 0.08 |
| Dia @ 90 mm | 3.82 | 56.14 | 56.05 | 56.10 | 0.05 |
| Dia @ 38 mm | 2.50 | 51.82 | 51.69 | 51.76 | 0.07 |
| Dia @ 20 mm | 0.44 | 55.29 | 55.23 | 55.27 | 0.03 |
| Initial $CO_2$ | | 4.260 | 4.070 | 4.137 | 0.107 |
| Final $CO_2$ | | 3.98 | 3.86 | 3.92 | 0.06 |

Example 11. Shelf Life Studies with and without Coatings for Various Bottles This example, along with FIGS. 12A, 12B, and 12C, illustrates and compares the Weight Distribution Efficiency (WDE) for a 250 mL (9.3 g) bottle designated as New PET Design 3 (FIG. 12A), a 250 mL (9.5 g) bottle designated as New PET Design 4 (FIG. 12B), and a 300 mL (9.6 g) bottle designated as New PET Design 2 (FIG. 12C). Performance data are provided in the table below, along with data for a 250 mL new bottle, showing coated and uncoated performance data with respect to WDE. FIGS. 12A, 12B, and 12C illustrate the WDE data. As seen in the data, there is a correlation between WDE, FT-IR and creep (thermal stability) performance, even with higher available weight performance degradation due to the shape and design change.

The data illustrate that with creep less than 4% on the PET new design there is unexpectedly high shelf life increase with the coating. With creep higher than 4% on the New PET Design 4 container we can see that the shelf life with coating is also higher but not as high as on the New PET Design 3. Data also shows that the New PET Design 3 has much higher shelf life at ambient temperatures than the New PET Design 2. For example, for the 300 ml New PET Design 3, the shelf life is fairly low, likely because of lower side wall thickness and slightly less optimized WDE, as shown in FIGS. 12A, 12B, and 12C.

TABLE 21

Shelf life and related data for various bottles

| Design | Wt. (gm) | Coated/ Uncoated | OTR- (cc/pkg/ day) | OTR-after creep (cc/pkg/ day) | Burst Pressure (psi) | Expansion at 135 psi (13 secs) | Shelf Life (days) FT-IR 22° C. | Shelf Life (days) FT-IR 30° C. | Shelf Life (days) FT-IR 38° C. | Thermal Stability (label panel) | Thermal Stability (pinch) |
|---|---|---|---|---|---|---|---|---|---|---|---|
| 250 ml (run-1) New PET Design 3 | 9.3 | uncoated | | | 224 | 5.20% | 53 | | 24 | 2.16% | 3.38% |
| 250 ml-(run-1) New PET Design 3 | 9.3 | coated | 0.001 | 0.004 | | | 383 | 228 | 158 | | |

TABLE 21-continued

Shelf life and related data for various bottles

| Design | Wt. (gm) | Coated/ Uncoated | OTR- (cc/pkg/ day) | OTR-after creep (cc/pkg/ day) | Burst Pressure (psi) | Expansion at 135 psi (13 secs) | Shelf Life (days) FT-IR 22° C. | Shelf Life (days) FT-IR 30° C. | Shelf Life (days) FT-IR 38° C. | Thermal Stability (label panel) | Thermal Stability (pinch) |
|---|---|---|---|---|---|---|---|---|---|---|---|
| 250 ml (run-3) New PET Design 4 | 9.5 | uncoated | | | | | 51 | | 24 | 2.95% | 6.96% |
| 250 ml (run-3) New PET Design 4 | 9.5 | coated | 0.001 | 0.004 | 190 | 9.30% | 281 | 132 | 100 | | |
| 250 ml New PET Design 2 | 9.6 | uncoated | 0.042 | | 245 | | 44 | 33 | 26 | 2.17% | 3.45% |
| 250 ml New PET Design 2 | 9.6 | coated | 0.001 | 0.004 | | | 304 | 148 | 125 | | |
| 300 ml | 9.95 | uncoated | 0.052 | | 208 | 9.10% | 43 | | 23 | 1.70% | 3.85% |
| 300 ml | 9.95 | coated | 0.003 | 0.008 | | | 398 | | 175 | | |

TABLE 22

Shelf life, thermal stability, and related data for various bottles

Variable Descriptions

| Design | bottle size | Bottle Type | Fill condition | Storage condition (Temp/RH) | Closure Type |
|---|---|---|---|---|---|
| Contour | 250 mL | Control PET | dry ice | 22 C./50% RH | Standard |
| Contour | 250 mL | SiOx | dry ice | 22 C./50% RH | Standard |
| Std | 15.6 g/200 mL | Control PET | dry ice/3 g H2O | 22 C./50% RH | Standard |
| Std | 15.6 g/200 mL | SiOx | dry ice/3 g H2O | 22 C./50% RH | Standard |
| Std | 15.6 g/200 mL | Control PET | dry ice/3 g H2O | 22 C./50% RH | epoxy over coat |
| Std | 15.6 g/200 mL | SiOx | dry ice/3 g H2O | 22 C./50% RH | epoxy over coat |
| Std | 15.6 g/200 mL | Control PET | dry ice/3 g H2O | 22 C./50% RH | induction seal |
| Std | 15.6 g/200 mL | SiOx | dry ice/3 g H2O | 22 C./50% RH | induction seal |
| Std | 15.6 g/200 mL | Control PET | dry ice/3 g H2O | 38 C./85% RH | Standard |
| Std | 15.6 g/200 mL | SiOx | dry ice/3 g H2O | 38 C./85% RH | Standard |
| Std | 15.6 g/200 mL | Control PET | dry ice/3 g H2O | 38 C./85% RH | epoxy over coat |
| Std | 15.6 g/200 mL | SiOx | dry ice/3 g H2O | 38 C./85% RH | epoxy over coat |
| Std | 15.6 g/200 mL | Control PET | dry ice/3 g H2O | 38 C./85% RH | induction seal |
| Std | 15.6 g/200 mL | SiOx | dry ice/3 g H2O | 38 C./85% RH | induction seal |
| New | 8.3 g/200 mL | Control PET | dry ice/3 g H2O | 22 C./50% RH | Standard |
| New | 8.3 g/200 mL | SiOx | dry ice/3 g H2O | 22 C./50% RH | Standard |
| New | 8.3 g/200 mL | DLC | dry ice/3 g H2O | 22 C./50% RH | Standard |
| New | 8.3 g/200 mL | Control PET | dry ice/3 g H2O | 38 C./85% RH | Standard |
| New | 8.3 g/200 mL | SiOx | dry ice/3 g H2O | 38 C./85% RH | Standard |
| New | 9.3 g/250 mL | Control PET | dry ice/3 g H2O | 22 C./50% RH | Standard |
| New | 9.3 g/250 mL | SiOx | dry ice/3 g H2O | 22 C./50% RH | Standard |
| New | 9.3 g/250 mL | DLC | dry ice/3 g H2O | 22 C./50% RH | Standard |
| New | 9.3 g/250 mL | Control PET | dry ice/3 g H2O | 38 C./85% RH | Standard |
| New | 9.3 g/250 mL | SiOx | dry ice/3 g H2O | 38 C./85% RH | Standard |

TABLE 22-continued

Shelf life, thermal stability, and related data for various bottles

| | | | | | |
|---|---|---|---|---|---|
| New | 9.3 g/250 mL | DLC | dry ice/3 g H2O | 38 C./85% RH | Standard |
| New | 9.5 g/250 mL | Control PET | dry ice/3 g H2O | 22 C./50% RH | Standard |
| New | 9.5 g/250 mL | SiOx | dry ice/3 g H2O | 22 C./50% RH | Standard |
| New | 9.5 g/250 mL | Control PET | dry ice/3 g H2O | 38 C./85% RH | Standard |
| New | 9.5 g/250 mL | SiOx | dry ice/3 g H2O | 38 C./85% RH | Standard |
| New | 9.6 g/250 mL | Control PET | dry ice/3 g H2O | 22 C./50% RH | Standard |
| New | 9.6 g/250 mL | SiOx | dry ice/3 g H2O | 22 C./50% RH | Standard |
| New | 9.6 g/250 mL | Control PET | dry ice/3 g H2O | 38 C./85% RH | Standard |
| New | 9.6 g/250 mL | SiOx | dry ice/3 g H2O | 38 C./85% RH | Standard |
| New | 9.95 g/300 mL | Control PET | dry ice/3 g H2O | 22 C./50% RH | Standard |
| New | 9.95 g/300 mL | SiOx | dry ice/3 g H2O | 22 C./50% RH | Standard |
| New | 9.95 g/300 mL | Control PET | dry ice/3 g H2O | 38 C./85% RH | Standard |
| New | 9.95 g/300 mL | SiOx | dry ice/3 g H2O | 38 C./85% RH | Standard |

| Variable Descriptions Design | Thermal Stability (label panel) | Thermal Stability (pinch) | FTIR Outputs FTIR $CO_2$ loss (% loss/week) | Shelf life (days) | SIF (Shelf Life Improvement) |
|---|---|---|---|---|---|
| Contour | | | 3.24 | 46 | |
| Contour | 2.40% | 11.30% | 1.07 | 140 | 3.0 |
| Std | | | 1.81 | 74 | |
| Std | 1.60% | 3.60% | 0.61 | 240 | 3.2 |
| Std | | | 1.72 | 78 | |
| Std | | | 0.46 | 309 | 4.0 |
| Std | | | 1.57 | 84 | |
| Std | | | 0.29 | 496 | 5.9 |
| Std | | | 3.67 | 31 | |
| Std | 1.60% | 3.60% | 2.50 | 63 | 2.0 |
| Std | | | 3.31 | 34 | |
| Std | | | 2.23 | 69 | 2.1 |
| Std | | | 2.87 | 39 | |
| Std | | | 1.81 | 84 | 2.1 |
| New | 1.86% | 3.14% | 3.57 | 42 | |
| New | | | 0.45 | 330 | 7.9 |
| New | | | 0.46 | 324 | 7.7 |
| New | 1.86% | 3.14% | 7.13 | 21 | |
| New | | | 1.01 | 149 | 7.1 |
| New | 2.16% | 3.38% | 3.00 | 50 | |
| New | | | 0.39 | 383 | 7.7 |
| New | | | 0.31 | 477 | 9.5 |
| New | 2.16% | 3.38% | 6.24 | 24 | |
| New | | | 0.95 | 158 | 6.6 |
| New | | | 1.42 | 106 | 4.4 |
| New | 2.95% | 6.96% | 3.19 | 47 | |
| New | | | 0.53 | 281 | 6.0 |
| New | 2.95% | 6.96% | 6.24 | 24 | |
| New | | | 1.50 | 100 | 4.2 |
| New New | 2.17% | 3.45% | 3.40 | 44 | |
| New New | 2.17% | 3.45% | 6.24 | 24 | |
| New New | 1.70% | 3.85% | 3.48 | 43 | |
| New New | 1.70% | 3.85% | 6.51 | 23 | |

Example 12. Creep Studies

The results from a creep study are illustrated in FIG. 10, in which a plot of creep ratio (%) versus time (days) for a 250 mL inventive bottle is provided, showing the significantly improved creep ratio as compared to the conventional contour bottle illustrated in FIG. 11. FIG. 11 illustrates the results from a comparative creep study, by providing a plot of creep ratio (%) versus time (days) for a 500 mL conventional contour bottle.

The disclosures of various publications may be referenced throughout this specification, which are hereby incorporated by reference in pertinent part in order to more fully describe the state of the art to which the disclosed subject matter pertains. To the extent that any definition or usage provided by any document incorporated herein by reference conflicts with the definition or usage provided herein, the definition or usage provided herein controls.

Throughout the specification and claims, the word "comprise" and variations of the word, such as "comprising" and "comprises," means "including but not limited to," and is not intended to exclude, for example, other additives, components, elements, or steps. While methods and features are described in terms of "comprising" various steps or components, these methods and features can also "consist essentially of" or "consist of" the various steps or components.

Unless indicated otherwise, when a range of any type is disclosed or claimed, for example a range of the percentages, WDEs, diameters, weights, and the like, it is intended to disclose or claim individually each possible number that such a range could reasonably encompass, including any sub-ranges or combinations of sub-ranges encompassed therein. When describing a range of measurements such as these, every possible number that such a range could reasonably encompass can, for example, refer to values within the range with one significant figure more than is present in the end points of a range, or refer to values within the range with the same number of significant figures as the end point with the most significant figures, as the context indicates or permits. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicants' intent is that these two methods of describing the range are interchangeable. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, or within 2% of the recited value.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

Applicants reserve the right to proviso out any selection, feature, range, element, or aspect, for example, to limit the scope of any claim to account for a prior disclosure of which Applicants may be unaware.

The following numbered aspects of this disclosure are provided, which state various attributes, features, and embodiments of the present invention both independently, or in any combination when the context allows. That is, as the context allows, any single numbered aspect and any combination of the following numbered aspects provide various attributes, features, and embodiments of the present disclosure.

1. A Carbonated Soft Drink (CSD) PET container or bottle, wherein the container or bottle is uncoated (optionally weighing less than or about 13 g), wherein the difference between area distribution (%) and weight distribution (%) in the base section (pressure resistant base) is less than or about 8%, or alternatively, less than or about 5%.
2. A CSD PET container wherein the difference between area distribution (%) and weight distribution (%) in the shoulder section (defined as the "top" section of FIG. 3) is less than 8%, or alternatively, less than 5%.
3. A CSD PET container wherein the sectional area to weight ratio (A/W, $cm^2/g$) for any given section is within 25% of the overall surface area to weight (excluding finish) ratio, or alternatively, within 15% of the overall ratio. In this aspect, for example, individual sections i can be determined by dividing the container into n total sections according to Method A (FIG. 7). Typically, the number of sections n can be 3, 4, 5, 6, 7, or 8; more typically, n can be 4, 5, or 6; more typically still, n can be 5.
4. A container for CSDs which simultaneously maintains the ratio of the finish weight to total bottle weight at 25% or less, when the opening size is less than 19 mm.
5. A CSD PET container having an opening size (I diameter) less than 19 mm, or alternatively, less than 17 mm.
6. A CSD PET container having a shelf life (3.3 carbonation volume at end of shelf life, that is, elapsed time from 4.2 to 3.3 volumes $CO_2$) greater than or about 40 days at 22° C.; alternatively, greater than or about 45 days at 22° C.; or alternatively, greater than or about 50 days at 22° C.
7. A CSD PET container having an opening less than or about 19 mm, and having a shelf life (3.3 carbonation volume at end of shelf life, that is, elapsed time from 4.2 to 3.3 volumes $CO_2$) greater than or about 40 days at 22° C.; alternatively, greater than or about 45 days at 22° C.; or alternatively, greater than or about 50 days at 22° C.
8. A CSD PET container having an average side wall thickness greater than or about 0.20 mm; or alternatively, greater than or about 0.25 mm.
9. A CSD PET container having a thickness ratio in the shoulder (measured 5 mm under the support ring) to the side wall less than or about 2.0; or alternatively, less than or about 1.5.
10. A CSD PET container having a base thickness ratio (thickness measured at Gate to thickness measured 5 mm from gate) of less than or about 4; or alternatively, less than or about 3.
11. A small size container (less than or about 250 mL) for carbonated soft drinks having a 17 mm opening size (inner diameter), and having a shelf life that is at least about 20% greater than a corresponding container having the equivalent useable material and a standard 28 mm finish.
12. A small size container (less than or about 250 mL) for carbonated soft drinks having a weight distribution efficiency (WDE) greater than or about 95%; alternatively, greater than or about 96%; alternatively, greater than or about 97%; or alternatively, greater than or about 98%.
13. A container for carbonated soft drinks having a weight distribution efficiency (WDE) greater than or about 97%, wherein the opening size (inner diameter) is about 22 mm or less; alternatively, about 21 mm or less; alternatively, about 20 mm or less; or alternatively, about 19 mm or less.
14. A small size container (less than or about 250 mL) having a higher crystallinity (>9%) and orientation (Trans content >70%) in the base area adjacent to the gate (5-15 mm distance from gate) as compared to containers made with standard 28 mm finish.
15. A preform for manufacturing carbonated soft drink containers having an end cap weight of less than or about 0.8 g.
16. A preform for manufacturing carbonated soft drink containers having less than or about 250 mL nominal volume and a preform end cap diameter less than or about 17 mm.
17. A preform for manufacturing carbonated soft drink containers from about 250 mL to about 400 mL nominal volume and a preform end cap diameter less than or about 18 mm.
18. A preform for manufacturing carbonated soft drink containers having less than or about 400 mL nominal volume and a finish ID/preform OD ratio from about 0.90 to about 1.20.
19. A preform for manufacturing carbonated soft drink containers or a container as disclosed herein, further comprising a material selected from nylon MXD6, a nylon blend comprising nylon MXD6, a polyethylene naphthalate (PEN)/PET co-polymer, a PEN and PET blend, a poly Glycolic Acid (PGA), poly(ethylene furan-2,5-dicarboxylate) (PEF), and PET blend.
20. A preform for manufacturing carbonated soft drink containers or a container as disclosed herein, further comprising an additive selected from a nucleating additive, a chain branching agent, or a combination thereof.
21. A CSD bottle comprising a monolayer or multilayer of PET, having a shelf life of greater than or about 50 days, and a resin weight equal to or less than or about 12.0 grams; alternatively, less than or about 11.9 grams; or; alternatively, less than or about 11.8 grams.
22. A CSD bottle comprising a monolayer or multilayer of PET, having a shelf life in days (y) of greater than or equal to the shelf life predicted using the following formula: $y=(6.1 \times x)-25$, wherein y is shelf life (days), and x is the weight of the bottle (grams).

The following further aspects of this disclosure are provided, which set out additional attributes, features, and embodiments of the present invention both independently, or in any combination when the context allows. That is, as the context allows, any single numbered aspect and any combination of the following numbered aspects provide various attributes, features, and embodiments of the present disclosure.

1. A preform for a carbonated soft drink (CSD) container having an internal surface and an external surface, the preform comprising
   a) a polymer monolayer or multilayer;
   b) a neck finish less than or about 25 mm (T dimension); and
   c) a preform outside body diameter (OD) less than or about 19 mm;
   wherein the preform weighs less than or about 13 g, the preform comprises or is absent an internal and/or an external gas barrier coating.
2. A preform according to the above aspect, wherein the polymer comprises a nylon, a polyester, or a polyamide.
3. A preform according to any of the above aspects as the context allows, wherein the polymer comprises a material selected from nylon MXD6, a nylon blend comprising nylon MXD6, PET, poly(trimethylene furan-2,5-dicarboxylate) (PTF), also called poly(propylene furan-2,5-dicarboxylate) (PPF), poly(trimethylene terephthalate) (PTT), a polyethylene naphthalate (PEN)/PET co-polymer, a PEN and PET blend, a poly Glycolic Acid (PGA), PEF, and PET blend.
4. A preform according to any of the above aspects as the context allows, wherein the preform comprises a PET monolayer or multilayer weighing less than or about 13 g.
5. A preform according to any of the above aspects as the context allows, wherein the preform comprises a PET monolayer or multilayer weighing less than or about 11 g.
6. A preform according to any of the above aspects as the context allows, further comprising any one or more of the following properties:
   a) a finish ID/Preform OD Ratio from about 0.90 to about 1.20;
   b) a preform end cap diameter (mm) from about 14 mm to about 19 mm; and/or
   c) a preform end cap weight (g) less than or about 10% of preform weight.
7. A Carbonated Soft Drink (CSD) container prepared from any of the preforms described in the previous aspects.
8. A Carbonated Soft Drink (CSD) container, having any one or more of the following properties:
   a) a difference between area distribution (%) and weight distribution (%) in the container base section, the container shoulder section, or both the container base and the container shoulder sections is less than 8%;
b) a shelf life (elapsed time from 4.2 to 3.3 volumes $CO_2$) of greater than or about 271 days at 22° C.;
c) a sectional area to weight ratio (A/W, $cm^2/g$) for any given section is within 25% of the overall surface area to weight (excluding finish) ratio;
d) a weight distribution efficiency (WDE) greater than or about 95%; and/or
e) a localized creep of less than or about 4 percent;
wherein the container comprises an internal and/or an external gas barrier coating.

9. A Carbonated Soft Drink (CSD) container according to the above aspect, wherein the CSD container further comprises an internal and an external barrier coating material.

10. A Carbonated Soft Drink (CSD) container according to any of the above aspects as the context allows, wherein the CSD container further comprises an internal and/or external barrier coating material comprising or selected independently from silica ($SiO_x$), amorphous carbon, or a diamond-like carbon (DLC) material.

11. A Carbonated Soft Drink (CSD) container according to any of the above aspects as the context allows, wherein the surface area to weight ratio (sq mm/g or $mm^2/g$) is greater than or about 2800 sq mm/g, the surface area to weight ratio is greater than or about 3000 sq mm/g, or the surface area to weight ratio is greater than or about 3300 sq mm/g.

12. A Carbonated Soft Drink (CSD) container according to any of the above aspects as the context allows, wherein the surface area to weight ratio (sq mm/g or $mm^2/g$) is greater than or about 2800 sq mm/g, the surface area to weight ratio is greater than or about 3000 sq mm/g, or the surface area to weight ratio is greater than or about 3300 sq mm/g.

13. A Carbonated Soft Drink (CSD) container according to any of the above aspects as the context allows, wherein the local diameter creep (diameter increase when filled with carbonated water at 4.2 Gas Volumes (GV) and conditioned at 38° C. for 24 hours) measured at any location in the container is less than 4%, less than 3.5%, or less than 3%.

14. A Carbonated Soft Drink (CSD) container according to any of the above aspects as the context allows, wherein the local diameter creep (diameter increase when filled with carbonated water at 4.2 Gas Volumes (GV) and conditioned at 38° C. for 24 hours) measured at any location in the container is less than 4%, less than 3.5%, or less than 3%.

15. A Carbonated Soft Drink (CSD) container according to any of the above aspects as the context allows, wherein overall volume expansion (% volume increase) when pressurized to 135 psi (at 22° C.) for 13 seconds is less than or about 10%, less than or about 9%, less than or about 7%, or less than or about 5.5%.

16. A Carbonated Soft Drink (CSD) container according to any of the above aspects as the context allows, wherein the overall volume expansion (% volume increase) when pressurized to 135 psi (at 22° C.) for 13 seconds is less than or about 10%, less than or about 9%, less than or about 7%, or less than or about 5.5%.

17. A Carbonated Soft Drink (CSD) container according to any of the above aspects as the context allows, wherein the Shelf life Improvement factor (SIF, the ratio of shelf life for a coated and uncoated container as measured by FT-IR at 22° C.) is more than 5.0, more than 6.0, or more than 7.0.

18. A Carbonated Soft Drink (CSD) container according to any of the above aspects as the context allows, wherein the Shelf life (as measured using FT-IR at 22° C. for a reduction in gas volume from 4.2 to 3.3) is more than or about 350 days, alternatively, more than or about 300 days, alternatively, more than or about 270 days, or alternatively, more than or about 250 days.

19. A Carbonated Soft Drink (CSD) container, having any two or more of the following properties:
a) a difference between area distribution (%) and weight distribution (%) in the container base section, the container shoulder section, or both the container base and the container shoulder sections is less than 8%;
b) a shelf life (elapsed time from 4.2 to 3.3 volumes $CO_2$) of greater than or about 271 days at 22° C.;
c) a sectional area to weight ratio (A/W, $cm^2/g$) for any given section is within 25% of the overall surface area to weight (excluding finish) ratio;
d) a weight distribution efficiency (WDE) greater than or about 95%; and/or
e) a localized creep of less than or about 4 percent;
wherein the container comprises an internal and an external gas barrier coating.

20. A Carbonated Soft Drink (CSD) container according to any of the above aspects as the context allows, the container further comprising one or more of the following properties:
f) a container size less than or about 400 mL, or alternatively, less than or about 360 mL;
g) a higher crystallinity (>9%) in the base area at any point adjacent to the gate (within from 5 mm to 15 mm distance from gate, as compared to the corresponding crystallinity (>9%) in the base area of a container made with standard 28 mm finish; and/or
h) at least 70% trans content at a distance of 5 mm from the gate.

21. A method of improving the shelf life of a carbonated soft drink (CSD), the method comprising:
a) providing a preform for a carbonated soft drink (CSD) container, the preform comprising a PET monolayer or multilayer weighing less than or about 13 g; a neck finish less than or about 25 mm; and a preform diameter less than or about 19 mm;
b) stretch blow-molding the preform to form a CSD container; and
c) packaging the CSD in the stretch blow-molded CSD container.

22. A method of improving the shelf life of a carbonated soft drink (CSD) according to the above method aspect, further comprising providing the CSD container with an internal and/or external barrier coating material after stretch blow-molding the preform to form the CSD container.

23. A method of improving the shelf life of a carbonated soft drink (CSD) according to any of the above method aspects as the context allows, wherein the preform further comprising any one or more of the following properties:
a) a Finish ID/Preform OD Ratio from about 0.90 to about 1.20;
b) a preform end cap diameter (mm) from about 14.25 mm to about 19 mm; and/or c) a preform end cap weight (g) less than 10% of preform weight.

24. A method of improving the shelf life of a carbonated soft drink (CSD) according to any of the above method aspects as the context allows, wherein the Carbonated Soft Drink (CSD) container has any one or more of the following properties:
   a) a difference between area distribution (%) and weight distribution (%) in the container base section, the container shoulder section, or both the container base and the container shoulder sections is less than 8%;
   b) a shelf life (elapsed time from 4.2 to 3.3 volumes $CO_2$) of greater than or about 41 days;
   c) a sectional area to weight ratio (A/W, $cm^2/g$) for any given section is within 25% of the overall surface area to weight (excluding finish) ratio;
   d) a weight distribution efficiency (WDE) greater than or about 95%;
   e) a container size less than or about 300 mL;
   f) a higher crystallinity (>9%) in the base area at any point adjacent to the gate (within from 5 mm to 15 mm distance from gate, as compared to the corresponding crystallinity (>9%) in the base area of a container made with standard 28 mm finish; and/or
   g) at least 70% trans content at a distance of 5 mm from the gate.

25. A method of preparing a small, light-weight Carbonated Soft Drink (CSD) container having an improved shelf life, the method comprising:
   a) providing a preform comprising a PET monolayer or multilayer weighing less than or about 10 g, a neck finish diameter less than or about 22 mm (T dimension), and a preform diameter less than or about 15.75 mm;
   b) stretch blow-molding the preform to form a Carbonated Soft Drink (CSD) container having less than or about 300 mL volume, or alternatively, less than or about 360 mL;
   wherein the weight percentage of PET material in the preform neck straight and the perform base are less than the corresponding weight percentages of PET material in a conventional 28 mm finish preform.

26. A method of preparing a small, light-weight Carbonated Soft Drink (CSD) container having an improved shelf life according to the above method, the method further comprising providing the CSD container with an internal and/or external barrier coating material after stretch blow-molding the preform to form the CSD container.

27. A Carbonated Soft Drink (CSD) container having an internal surface and an external surface, the CSD comprising
   a) a polymer monolayer or multilayer;
   b) a neck finish less than or about 25 mm (T dimension); and
   c) an outside body diameter (OD) less than or about 19 mm;
wherein the container weighs less than or about 13 g, the container comprises or is absent an internal and/or an external gas barrier coating.

28. A Carbonated Soft Drink (CSD) container, having any one or more of the following properties:
   a) a difference between area distribution (%) and weight distribution (%) in the container base section, the container shoulder section, or both the container base and the container shoulder sections is less than 8%;
   b) a shelf life (elapsed time from 4.2 to 3.3 volumes $CO_2$) of greater than or about 47 days at 22° C.;
   c) a sectional area to weight ratio (A/W, $cm^2/g$) for any given section is within 25% of the overall surface area to weight (excluding finish) ratio;
   d) a weight distribution efficiency (WDE) greater than or about 95%; and/or
   e) a localized creep of less than or about 4 percent;
   wherein the container is absent an internal and/or an external gas barrier coating.

29. A Carbonated Soft Drink (CSD) container, having any one or more of the following properties:
   a) a difference between area distribution (%) and weight distribution (%) in the container base section, the container shoulder section, or both the container base and the container shoulder sections is less than 8%;
   b) a shelf life (elapsed time from 4.2 to 3.3 volumes $CO_2$) of greater than or about 41 days at 22° C.;
   c) a sectional area to weight ratio (A/W, $cm^2/g$) for any given section is within 25% of the overall surface area to weight (excluding finish) ratio;
   d) a weight distribution efficiency (WDE) greater than or about 95%; and/or
   e) a localized creep of less than or about 4 percent;
   wherein the container is absent an internal and/or an external gas barrier coating.

30. A container made according to any one of method claims wherein the container is placed on a shelf for retail sale.

We claim:
1. A Carbonated Soft Drink (CSD) container, having:
an open top end, a neck finish at the top end, a support ring below the neck finish, a closed bottom end, and a vertical axis extending from the center of the top end to the center of the bottom end; and
a series of n horizontally divided and equal-height sections comprising a top section extending from the bottom of the support ring to a first horizontal plane below the support ring, a base section extending from the closed bottom end to a second horizontal plane above the closed bottom end, and n−2 middle sections extending between the first horizontal plane and the second horizontal plane, wherein n is an integer greater than or equal to 3;
wherein the container comprising the following properties:
   (a) a difference between area distribution (%) and weight distribution (%) in the top section, the base section, or both the top section and the base section of less than 8%, based upon the total area and total weight, respectively, of the top section and the base section;
   (b) a shelf life of a CSD contained therein (elapsed time as measured using FT-IR for a reduction in $CO_2$ volume in the container from 4.2 volumes $CO_2$ to 3.3 volumes $CO_2$ at 22° C.) of greater than or about 250 days;
   (c) a sectional surface area to weight ratio (A/W, $cm^2/g$) for any of the top section, the base section, and the middle sections which is within 25% of the ratio of the total surface area of the top section, the base section, and the middle sections to the total weight of the top section, the base section, and the middle sections;

(d) a weight distribution efficiency (WDE) greater than or about 95%, as measured by Method A; and (e) a local diameter creep (a diameter increase when the CSD container is filled with carbonated water at 4.2 Gas Volumes (GV) and conditioned at 38° C. for 24 hours) measured at any location in the CSD container, of less than or about 4 percent;

wherein the container comprises an internal gas barrier coating, an external gas barrier coating, or both an internal and an external gas barrier coating; and wherein Method A comprises the steps of horizontally dividing the CSD container between the bottom of the support ring and the closed bottom end into n equal-height sections, and calculating the weight distribution efficiency (WDE) by Method A according to the formula:

$$WDE = \frac{\frac{A}{W}}{\sum_{i=1}^{i=n} \frac{a_i}{w_i} \times Ai};$$

wherein $a_i$ is the surface area of the $i^{th}$ container section;

$w_i$ is the weight of the $i^{th}$ container section;

A is the total surface area of the container sections;

$A_i$ is the area fraction for section i;

W is the total weight of the container sections; and i is one of the n horizontally divided and equal-height sections into which the container is divided.

2. The Carbonated Soft Drink (CSD) container according to claim 1, wherein n is 3, 4, 5, 6, 7, or 8.

3. The Carbonated Soft Drink (CSD) container according to claim 1, wherein the CSD container comprises both an internal barrier coating and an external barrier coating.

4. The Carbonated Soft Drink (CSD) container according to claim 1, wherein the internal barrier coating and the external barrier coating are selected independently from silica (SiOx), amorphous carbon, or a diamond-like carbon (DLC) material.

5. The Carbonated Soft Drink (CSD) container according to claim 1, wherein the total surface area to total weight ratio (sq mm/g) is greater than or about 2800 sq mm/g.

6. The Carbonated Soft Drink (CSD) container according to claim 1, wherein the local diameter creep is less than 3.5%.

7. The Carbonated Soft Drink (CSD) container according to claim 1, further characterized by an overall volume expansion (% volume increase) when maintained at a pressure of 135 psi (at 22° C.) for 13 seconds is less than or about 10%.

8. The Carbonated Soft Drink (CSD) container according to claim 1, further characterized by an overall volume expansion (% volume increase) when maintained at a pressure of 135 psi (at 22° C.) for 13 seconds is less than or about 7%.

9. The Carbonated Soft Drink (CSD) container according to claim 1, further characterized by a Shelf life Improvement factor for the CSD container (the ratio of the shelf life for the CSD container to the shelf life of a corresponding uncoated container as measured by FT-IR at 22° C.) of more than 5.0 at 22° C.

10. The Carbonated Soft Drink (CSD) container according to claim 1, further characterized by a Shelf life Improvement factor for the CSD container (the ratio of the shelf life for the CSD container to the shelf life of a corresponding uncoated container as measured by FT-IR at 22° C.) of more than 4.0 at 38° C.

11. The Carbonated Soft Drink (CSD) container according to claim 1, wherein the shelf life is more than 350 days.

12. The Carbonated Soft Drink (CSD) container according to claim 1, wherein the shelf life is more than 300 days.

13. The Carbonated Soft Drink (CSD) container according to claim 1, wherein the shelf life is more than 271 days.

14. The Carbonated Soft Drink (CSD) container according to claim 1, wherein the CSD container is a polyethylene terephthalate (PET) container, and the CSD container further comprises any one or more of the following properties:

(f) a container size less than or about 400 mL;

(g) a PET crystallinity in the base section at any point within 5 mm from a gate of about 10%; and/or (h) at least 70% trans content at a distance of 5 mm from the gate.

15. The Carbonated Soft Drink (CSD) container according to claim 1, wherein the volume of the CSD container is less than or about 400 mL and the weight of the container is less than or equal to 13 g.

16. The Carbonated Soft Drink (CSD) container according to claim 1, wherein:

(a) the container comprises a polymer monolayer or a polymer multilayer, and (b) the polymer monolayer or the polymer multilayer comprises a nylon, a polyester, or a polyamide.

17. The Carbonated Soft Drink (CSD) container according to claim 16, wherein the polymer monolayer or the polymer multilayer comprises nylon MXD6, a nylon blend comprising nylon MXD6, PET, poly(trimethylene furan-2,5-dicarboxylate) (PTF), also called poly(propylene furan-2,5-dicarboxylate) (PPF), poly(trimethylene terephthalate) (PTT), a polyethylene naphthalate (PEN)/PET co-polymer, a PEN and PET blend, a poly Glycolic Acid (PGA), PEF, or PET blend.

18. A packaged shelf product comprising a Carbonated Soft Drink (CSD) container according to claim 1.

* * * * *